(12) United States Patent
Goodman et al.

(10) Patent No.: US 10,204,569 B2
(45) Date of Patent: Feb. 12, 2019

(54) IMAGE PIXEL FILL FACTOR FOR EXAMPLE IN A SOFTWARE CONFIGURABLE LIGHTING DEVICE

(71) Applicant: ABL IP Holding LLC, Conyers, GA (US)

(72) Inventors: Jonathan Lloyd Goodman, Ashburn, VA (US); David P. Ramer, Reston, VA (US); Ravi Kumar Komanduri, Brambleton, VA (US); Jack C. Rains, Jr., Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 137 days.

(21) Appl. No.: 15/475,778

(22) Filed: Mar. 31, 2017

(65) Prior Publication Data

US 2018/0286323 A1    Oct. 4, 2018

(51) Int. Cl.
- *G06K 9/36* (2006.01)
- *G09G 3/34* (2006.01)
- *G02B 5/02* (2006.01)

(52) U.S. Cl.
CPC ......... *G09G 3/3426* (2013.01); *G02B 5/0205* (2013.01); *G02B 5/0252* (2013.01); *G02B 5/0273* (2013.01); *G09G 2320/0646* (2013.01); *G09G 2340/04* (2013.01); *G09G 2340/0407* (2013.01)

(58) Field of Classification Search
CPC .......................... G02B 5/0205; G09G 2340/04
USPC ........................................................ 382/276
See application file for complete search history.

(56) References Cited

U.S. PATENT DOCUMENTS

| | | | |
|---|---|---|---|
| 5,300,942 A | 4/1994 | Dolgoff | |
| 5,602,679 A | 2/1997 | Dolgoff et al. | |
| 5,900,982 A | 5/1999 | Dolgoff et al. | |
| 7,576,715 B2* | 8/2009 | Choi | G09G 3/2022 345/60 |
| 7,688,347 B2 | 3/2010 | Dolgoff | |
| 8,077,365 B2* | 12/2011 | Cable | G03H 1/2205 359/32 |

(Continued)

OTHER PUBLICATIONS

Fraunhofer-Gesellschaft, "Sky light sky bright—in the office" Research News Jan. 2, 2012.

(Continued)

*Primary Examiner* — Thuy Vinh Tran
(74) *Attorney, Agent, or Firm* — RatnerPrestia

(57) ABSTRACT

Examples relate to a method and implementations of general illumination light emitters, an image display device and an image diffuser in a luminaire. The image display device is configured to output an image having a reduced, or first, pixel image fill factor and, as a result, might appear pixelated. To mitigate the pixelation, the image diffuser has a predetermined image diffusion angle and is a predetermined distance from the image display device. The image diffuser outputs an image having a second image pixel fill factor that is greater than the first image pixel fill factor. The appearance of the outputted image appears to be formed from fuzzy pixels. Characteristics related to the image, device, diffuser, and their arrangement may be optimized to provide the fuzzy pixels. A luminaire may output an image formed of the fuzzy pixels and general illumination lighting to an area.

27 Claims, 11 Drawing Sheets

(56) References Cited

U.S. PATENT DOCUMENTS

2006/0055838 A1    3/2006  Mi et al.
2012/0002256 A1*   1/2012  Lacoste .............. G02B 27/0081
                                                                    359/9
2015/0301781 A1   10/2015  Ekkaia et al.

OTHER PUBLICATIONS

Matthias Bues et al. "Convergence of Lighting and Display: Opportunities, Requirements, Challenges", SID 2016 Digest, pp. 110-113.
Jason Mitchell et al., "Shading in Valve's Source Engine, SIGGRAPH06", '200/ Valve Corporation, Chapter 8, http://www.valvesoftware.com/publications/2006/SIGGRAPH06_Course_ShadingInValvesEngine.pdf.
Katie Scott, "Engineers create virtual sky for office ceilings", Jan. 4, 2012, (Wired UK) http://www.wired.co.uk/news/archive/2012-01/04/office-ceilings-made-to-mimic-the-sky.
Eliot Shorr-Parks, "How big is the Dallas Cowboys' massive screen in AT&T Stadium?", Nov. 27, 2014, NJ Advance Media for NJ.com, http://www.nj.com/eagles/index.ssf/2014/11/how_big_is_the_dallas_cowboys_massive_screen_in_att_stadium.html.

* cited by examiner

IMAGE PIXEL FILL FACTOR FOR EXAMPLE IN A SOFTWARE CONFIGURABLE LIGHTING DEVICE

TECHNICAL FIELD

The present subject matter relates to techniques for processing image data for presentation and/or optical processing of light output from low resolution pixels, for example, for the display element of a software configurable lighting device, such that pixelation or mosaicking of the presented image is mitigated to enable the presented image to be more readily recognized by a viewer of the image.

BACKGROUND

Display devices have become ubiquitous. In addition to the obvious television and computer monitor implementations, display devices are present in home appliances, smart phones, billboards, stadium scoreboards, fast food restaurant menu boards, children's toys and the like. The intent is to deliver more content, e.g., movies, videos, pictures, graphics and the like, to users at as high of a resolution as possible. For many such applications, users perceive higher resolution images or videos as clearer and more detailed.

The resolution of the display devices has drastically increased in the last decade from the lower resolution, or standard definition, displays to the higher resolution, or high definition (HD) displays: and HD displays are being supplanted by even higher resolution equipment, such as ultra-high definition 4K, and even ultra-high definition 8K.

The distance between the individual pixels of a display device, whether high resolution or low resolution, is referred to as the "pixel pitch." For example, pixel pitch may be the distance from the center of a light emitting diode (LED) cluster (or pixel) of an LED based display to the center of the next LED cluster/pixel in the display. In a low resolution display, the pixel pitch may be measured in millimeters or less. The distance between individual pixels of the low resolution display device is typically greater than the distance between individual pixels of the high resolution display device. A "high" pixel pitch indicates a greater distance between the centers of individual pixels, and a "low" pixel pitch indicates a lesser, or shorter, distance.

Due to the low resolution (and/or relatively high pixel pitch) of a low resolution display, the image presented on the low resolution display may look pixelated. In a LED based low resolution direct emissive display, for example, each of the individual LED clusters or pixels are discernible by a viewer. An output image may exhibit visible rectangular or square artifacts. As a result of the pixelation, a viewer may not be able to easily ascertain the content of the image presented on the low resolution display.

SUMMARY

Hence, there is room for further improvement in display devices, e.g. for improving the quality of images from low resolution display devices.

An example of a lighting device as disclosed herein includes a general illumination light emitting array, an image display device, an output diffuser, a memory, a driver system and a processor. The general illumination light emitting array includes one or more light emitters. The light emitting array may be configured to generate general illumination light that provides general illumination to an area of a space in which the lighting device is located.

The image display device may be located proximate to the general illumination light emitting array, and has a number of image light emitters that output image light that presents an image having a first image pixel fill factor. The image display device is configured to output image light corresponding to an image to be presented to the area. The output diffuser has an output, and is configured to diffuse the general illumination light and the outputted image light at a predetermined diffusion angle. The output diffuser is positioned a distance from the image display device according to the predetermined diffusion angle.

The memory stores programming instructions. The processor has access to the memory. In the lighting device example, the processor is coupled to the driver system to control operation of the driver system for the generation and output of light from the general illumination light emitting device and the image display device. The driver system is coupled to supply drive signals to the general illumination light emitting array and the image display device. The processor executes the programming instructions stored in the memory which configures the lighting device to perform functions including functions in which image data of an image is obtained for presentation by the image display device. A general illumination setting is obtained for generation of the general illumination light to provide general illumination of the area. The driver system is operated based on the image data to output image light from the image display device toward the diffuser. At the output of the diffuser, an image is presented having a second image pixel fill factor greater than the first image pixel fill factor of the image output from the image display device.

An example of a luminaire is disclosed that includes a general illumination light emitter array, an optical element, an image display device and an output diffuser. The general illumination light emitter emits general illumination light toward an area to be illuminated. The optical element receives the emitted general illumination light, processes the received light and outputs the processed general illumination light. The image display device includes image light emitters that emit image light and a grid structure having partially transmissive areas adjacent to the image light emitters. Portions of the grid structure create occlusion areas by occluding part of the processed general illumination light output from the optical element. The output diffuser diffuses both the processed general illumination light output and the image light output by the image display device. The output diffuser disperses the image light output from the image light emitter at a diffusion angle to blend the processed general illumination light output and the image light output to fill the occlusion areas.

An example of an apparatus is provided that includes an image display device and an image diffuser. The image display device includes an image display device output and a number of light emitters. The image display device is configured to output a low-resolution image via image light output from the plurality of image light emitters. The outputted image has a pixelated appearance at the image display device output, the pixelated output image being pixelated due to a first image pixel fill factor. The image diffuser is configured to diffuse image light received from the image display device at a predetermined image diffusion angle, and present, at the output of the image diffuser, an image having a second image pixel fill factor greater than the first image pixel fill factor.

Some of the described examples disclose a method in which a processor coupled to a lighting device obtains image data from an image source. The obtained image data is transformed into a low-resolution image data appropriate for display by an image display device. The image display device in the lighting device is driven based on the low-resolution image data. The image display device outputs the low-resolution image light corresponding to the low-resolution image data toward an image diffuser coupled to the image display device. The low-resolution image light having a first image pixel fill factor, wherein an image formed by the low-resolution image light includes image artifacts. The image light received by the image diffuser is diffused by the image diffuser. The image diffuser is positioned to diffuse the image light from the image display device. At the output of the image diffuser, an output image having a second image pixel fill factor is presented. The second image pixel fill factor is determined based on a distance between the image diffuser and an output of the image display device, and mitigates the image artifacts in the output image.

In some examples, a luminaire is provided that includes a general illumination light emitter, a general illumination input diffuser, an image display device, an output diffuser, and a processor. The general illumination light emitter is configured to output general illumination light to provide general illumination to an area of a space in which the light is located. The general illumination light emitter has a general illumination light emitter divergence angle. The general illumination input diffuser may be positioned proximate to the output of the general illumination light emitter. The general illumination input diffuser has an input light diffusion angle, and is configured to diffuse the general illumination light output from the general illumination light emitter according to the input light diffusion angle according to the input light diffusion angle and the general illumination light emitter divergence angle. The image display device includes an image light emitter that outputs light having an image light divergence angle. The image display device has a first resolution, and is configured to output image light that presents a low resolution, pixelated image at an output of the image display device. The output diffuser has an output diffusion angle. The output diffuser is configured to receive the low resolution, pixelated image from the image display device, blend the image light of adjacent pixels of the low resolution, pixelated image to smooth the pixelated image according to the output diffusion angle and the image light divergence angle. The output diffuser outputs the general illumination light and the smoothed low resolution image. The processor is coupled to the general illumination light emitter and the image display device. The processor may be configured to control the general illumination light emitter to output the general illumination light and the image light emitter of the image display device to output the image light.

In an example, a lighting device has a luminaire that includes a lighting device, a diffuser and has a light emissive display. The lighting device also includes a processor coupled to the lighting element and the image display device to drive and control operation of the lighting element and the image display device. In this example, the lighting device includes a body with an illumination light output surface a predetermined distance from an opposing surface opposite the output surface. The lighting device also includes a source of an illumination light coupled to or integrated into the body of the lighting element, configured to generate illumination light for emission through the output surface as light to an area for a general illumination application of the luminaire. At least some portions of the body of the lighting device are transmissive with respect to visible light. The image display device has a number of image light emitters that output image light that forms an image having a first image pixel fill factor at an output of the opposing surface of the lighting element, and is coupled to supply light of an image to the opposing surface on the body of the lighting device for transmission through the body of the lighting element. The diffuser has an output diffusion angle, and is coupled to the output surface of the lighting element to allow passage of the image light that presents an image in the area and the general illumination light to that provides general illumination light to the area. The image light output from the diffuser has a second image pixel fill factor that is greater than the first image pixel fill factor. The second image pixel fill factor is based on the diffuser output diffusion angle, the predetermined distance between opposing surface and the output surface of the lighting element, and the first fill factor. The processor is coupled to the general illumination light source and the image display device to drive and control operation of the general illumination light source and the image display device, and is configured to: operate the illumination light source to generate the illumination light, and operate the display to emit the light of the image having the first image pixel fill factor.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
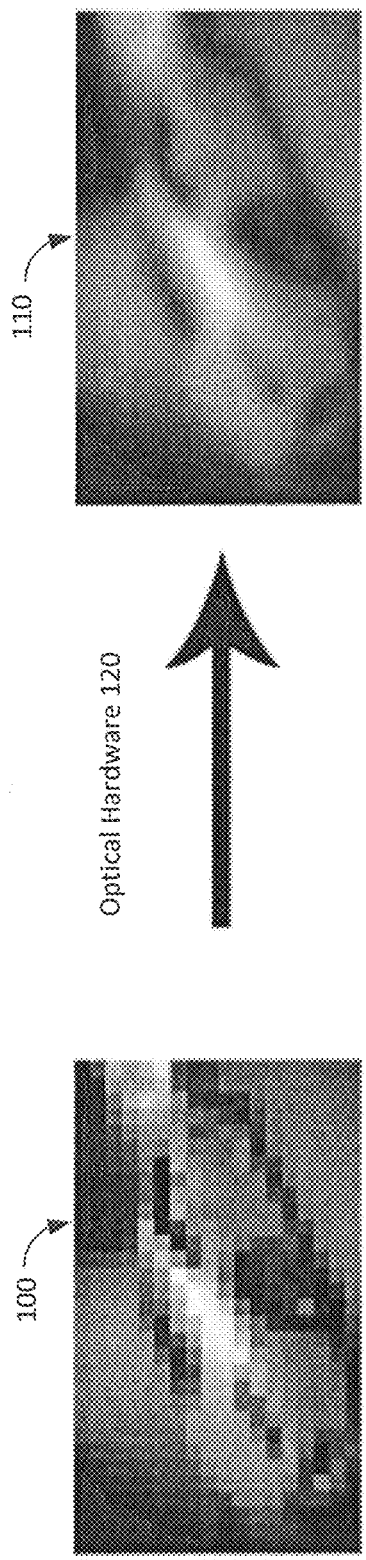
FIG. 1 illustrates an example of a low resolution input image that is processed by optical hardware to reduce image artifacts of the low resolution image.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The use of a higher resolution display device may be one way of solving problems presented by a low resolution display device. However, these high resolution display devices may not be cost effective or necessary for certain applications such as signage or a combination of image output with general illumination lighting functions. Hence, applications such as signage or informative décor (e.g., imagery that is intended to convey information), or configurable illumination lighting applications that incorporate a display device may continue using the lower resolution display devices until the higher resolution devices become more cost effective. In addition, when implemented as a sign or informative décor, for example, the viewer's inability to readily determine the content of the sign defeats the purpose of the sign. In addition, the pixelated content may not be aesthetically pleasing to a viewer, and as a result, the viewer may pay little or no attention to the sign.

Hence, an alternative solution may be desirable, for example, for an application in which a higher resolution display device cannot be used for one or more reasons.

To overcome the problems described above with regard to a low resolution display device, a combination of image processing techniques used to reduce the resolution of images having too high of a resolution for presentation of the images on a low resolution display device and optical hardware positioned in front of the displayed, low resolution image output may be used. In such an example, the image data of the image to be presented and the image light output from the display device may be processed or manipulated to produce a smoother transition between the pixels of the light output of the presented image, such that the light of the individual pixel outputs may be blended to provide at the output of the display device a more recognizable and/or aesthetically pleasing image than the pixelated image output from the low resolution display alone.

The display device and attendant processing and/or diffuse smoothing may have a variety of applications. In lighting for example, a combination of an image processor and a luminaire, which includes a general illumination light emitting array, a display device and optical hardware for image smoothing, may be incorporated into a combined lighting device. The combined lighting device may be configured, for example, to provide an image as described herein as well as general illumination lighting for an occupiable area in a space.

Reference now is made in detail to the examples illustrated in the accompanying drawings and discussed below.

FIG. 1 illustrates an example of a low resolution input image that is processed by optical hardware to reduce the effects image artifacts of the low resolution image.

As shown in FIG. 1, a low resolution display device may present an image, such as image 100, that may appear pixelated. A measure of the resolution of the display device is the number of the pixels in the display. "Pixel pitch" is the distance between the display device pixels (i.e., the light emitters) measured from the center of a first display device pixel (or light emitter) to the center of a second display device pixel (light emitter) of the display device.

In addition, there are other terms for describing resolution of a display device. For example, "display device pixel fill factor" relates to the fraction of the display pixel area within each of the individual display device pixels. In some examples, the electronics for the actual light emitters of a display device may take up 35% of the display device pixel area which leaves only 65% of the area for the light emitters. Such a display device may be considered to have a low fill factor meaning the LEDs take up only a fraction of the display area. As a result, the low fill factor for the image display device makes perception of some images difficult since not all the of the display device area is used for displaying an image. In image 100, spaces between pixels are not completely filled with image light, thereby leaving space that makes the image appear pixelated at the output.

But "fill factor" may also refer to "an image fill factor," which is different from but is related to the "display device fill factor." This lack of "fill" in the "display device fill factor" may, for example, result in the display of an image at the output of the display device that appears pixelated, such as image 100. In other words, the pixelated image may be partially due to the limited "fill factor" of the display device. For transparent displays, it is actually desirable to have a low fill factor for the display pixels to increase the transparency, assuming the electronics and the display pixels are not transparent, but at the same time a high image fill factor is desirable to improve perception by users. The discussion in this applications attempts to address this problem.

It may be appropriate to provide an explanation of a "pixelated image." A "pixelated image" may, for example, be made up of a small number of pixels (i.e., picture elements) of a display device that produce at the output of the display device an image which includes, for example, image artifacts such as stripes or bars related to gaps or spaces in the emission of the image light at the output of the display device. Due to a reduced image pixel fill factor of the low resolution display device, the image output by the display device may exhibit image artifacts, such as aliasing, mosaicking or pixelation, each image artifact, for example, may appear as a rectangle, a square, an oval or a circle in the image light output from the display device. An example of the resolution of the display device may be approximately 1 square foot with a light emitting array of approximately 64 by 64 at a display pixel pitch of approximately 8 millimeters. Of course, other display device configurations and display pixel pitches may be used.

As part of the process for providing a fuzzy pixel, by providing image data of a resolution appropriate for the resolution of the display device and selecting proper hardware, such as 120, the image artifacts attributable to the limited fill factor of the display device in the displayed image 100 may be smoothing out to provide an image such as image 110, the subject matter of which is more readily discernible as compared to image 100. The following discussion and examples also take into account an additional level of difficulty in that the hardware 120 should not significantly alter the illumination distribution since the light from both the LED display and the illumination LEDs goes through the same diffuser. In image 110, spaces between pixels are completely filled with image light, thereby blending image light from adjacent pixels which makes the image appear blurred, or fuzzy, at the output.

As will be described in more detail with reference to FIG. 2, the optical hardware 120 may be positioned to process the image 100 presented by the image light output of the display device. For example, the optical hardware 120 may be an optical diffuser (not shown in this example) that may spatially manipulate the presented pixelated image 100. In this example, the optical hardware 120 may disperse the image light at the output of the optical hardware 120 to increase the image pixel fill factor. The pixelated image 100 is produced due to the image light output by the image light emitters of the display device having a reduced image pixel fill factor. The outputted image light does not fill all of the gaps between adjacent image light emitters. The optical hardware 120 is configured to blend the image light output from adjacent image light emitters that produce the pixelated image 100 by increasing the image pixel fill factor to a second image pixel fill factor that is greater than the first image pixel fill factor, which smoothes the artifacts (e.g. diffuse the artifact edges) of the pixelated image 100. The output of the optical hardware 120 that is presented to an area is a smoothed image 110 that has a second image pixel pitch that is greater than the reduced, or first, image pixel fill factor. The smoothed image 110 produced by such processing may appear somewhat blurry (or fuzzy) but often may be a more recognizable and/or aesthetically pleasing image than the pixelated image 100 output from the low resolution display without any additional manipulation. Depending upon the configuration of the image display device, the configuration of the optical hardware 120, and the positioning of the optical hardware 120 with respect to the image display device, the smoothed image 110 has a second image fill factor that causes the presented image to appear smoother than the image 100 having the reduced, or first image pixel fill factor.

The pixelated image 100 with a number of edges around each image pixel has a first image pixel fill factor while the smoothed image 110 with blended, or smoothed edges around each fuzzy image pixel has a second image pixel fill factor that may be greater than from the first image pixel fill factor. In the example, the first image pixel fill factor is less than the second image pixel fill factor. As a result, the image generated with the first image pixel fill factor has artifacts, such as pixelation, mosaicking and/or aliasing due to gaps between adjacent image pixels. As a note, image pixels are different from display pixels. The display pixels may be considered the light emitters of the image display device, while the image pixels are the picture elements of the image 100 that is presented by the image display device.

While the above discussion was at a high level, the following discussion will explain the various aspects of image processing and optical hardware with reference to the examples depicted in FIGS. 2A-9.

Figure 2A:
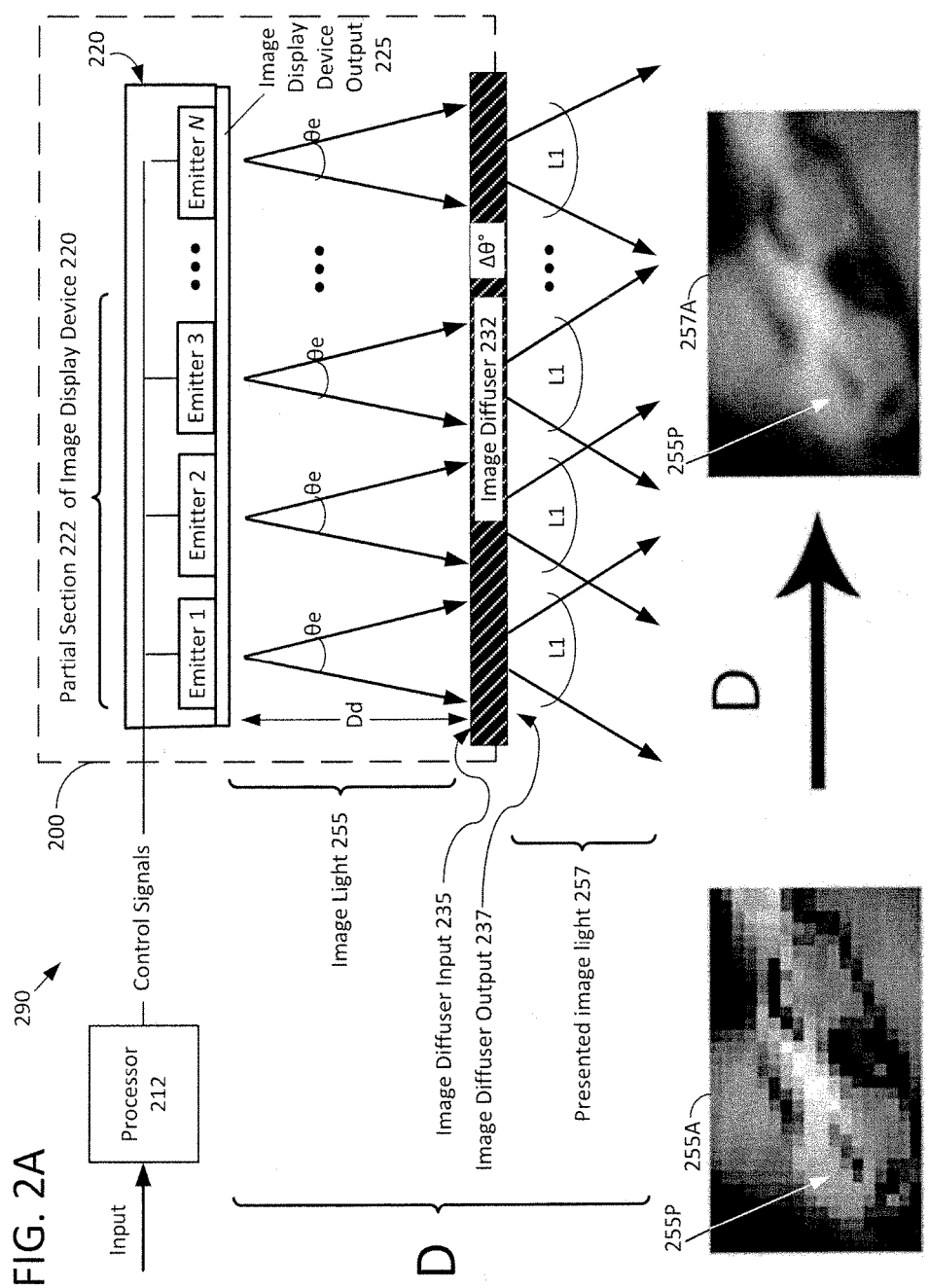
FIG. 2A illustrates block diagram and an application of an example of an apparatus configured to output a diffused image.

FIG. 2A illustrates a block diagram and an application of an example of an apparatus configured to output a diffused image, for example, analogous to the image 110 as described above. The apparatus 200 includes an image display device 220 and an image diffuser 232. A system 290 may include the apparatus 200 and a processor 212. The processor 212 may provide control signals to the apparatus 200.

The image display device 220 includes an image light emitter, such as image light emitters 1-N (where N is an integer) The image display device 220 is configured to output a low-resolution image via image light output from the image light emitters 1-N. The image output from the image display device 220 may have a pixelated appearance at an output of the image display device due to image pixels that have a reduced image pixel fill factor, or a first image pixel fill factor. An example of a pixelated image is image 225A that is pixelated due to the first image pixel fill factor being a reduced image pixel fill factor. Each image light emitter 1-N has an image light divergence angle θe. The image light divergence angle θe may range, for example, from 5-10 degrees, 7-15 degrees, 10-20 degrees, 40-60 degrees or the like, if an optic is present in front of the light emitters. When optics are not present in front of the light emitters, the divergence angle θe may range, for example, from approximately 120 to approximately 180 degrees. The image display device 220 may be configured to output a low-resolution image via image light output from the image light emitter, the image having a pixelated appearance at an output of the image display device. The image display device 220 may include a number of image light emitters, such as emitters A, B, C to N. For ease of discussion, FIG. 2 only shows a partial section 222 of the image display device 220. Depending upon the configuration of the respective image light emitters 1-N, each of the image light emitters 1-N may be individual pixels of the image display device 220. For example, each emitter 1-N may be formed of multiple light emitting diodes (LEDs) that each out light of a different color, such as red, green and blue. In this configuration, the image light emitter 1 is able to output a green light that in the form of pixel 255P of the image display device 220 when outputting image 255A.

Alternatively, each emitter 1-N may output a different color. For example, image light emitter 1 may output red light, image light emitter B may output green light and image light emitter 3 may output blue light. The image light emitters A-C may in response to signals from the processor 212 combine to form a pixel, such as pixel 255P of the image display device 220. The other remaining image light emitters (not shown) after light emitter 3 up to and including image light emitter N may, in this example, be configured to combine their respective colored light outputs similar to image light emitters 1-3.

The image light emitters 1-N are positioned a distance above the image display device output 225. The image display device output 225 does not affect the image light 255 output from the image light emitters 1-N. As a result, the image light 255 maintains the diffusion angle θe from each of the respective light emitters 1-N. The image light 255 presents an image, such as image 255A, that has a first image pixel fill factor.

The apparatus 200 also includes an image diffuser 232. The image diffuser 232 is the hardware D that enables the conversion of pixelated image 225A into the smoothed image 257A. The image diffuser 232 has an image diffuser output 237 at a plane of the image diffuser farthest from the light emitters 1-N. The image diffuser 232 may be configured to be a distance Dd from an output 225 of the image display device 220 that positions the image diffuser 232 proximate to the output 225 of the image display device 220. For example, the image diffuser 232 may be positioned below the image display device 220.

The arrangement (e.g., positioning or location) of the image diffuser 232 with respect to the output 225 of the image display device 220 is the distance Dd. The distance Dd depends on different aspects of diffusers as explained in more detail reference to the example of FIG. 3. The distance Dd between the image display device output 225 and the image diffuser input 235 and the image light divergence angle θe determines the extent of the light output by the respective image light emitters 1-N disperses from the image diffuser 232. Depending on the image diffusion angle (Δθ°) of the image diffuser 232 and the distance Dd, the image diffuser 232 disperses incident light received from the image display device output 225 at angle L1. The distance Dd, in this example, is measured between the image display device output 225 and the image diffuser input 235. Examples of the distance Dd when paired with an image diffuser having an image diffusion angle of approximately 40 degrees and an 8 mm pixel pitch of the image display device may be between approximately 1 inch and approximately 2 inches. In other examples that use different pixel pitches or image diffusers with different image diffusion angles, the distance Dd may be approximately 0 to 1 inch, 0.5 inches to 2.5 inches or the like depending upon the lighting and imaging application of the luminaire. In some examples, in addition to the image diffusion angle Δθ°, the image diffuser 232 may be configured to disperse incoming image light at different angles at different locations along the surface of the image diffuser 232.

The image diffuser 232 may be configured with a predetermined image diffusion angle Δθ°, assuming the diffuser is holographic type (such as films provided by Luminit, LLC. of Torrance, Calif.), for diffusing image light output from the image display device output 225. The predetermined image diffusion angle Δθ° may be between 10-15 degrees, 10-20 degrees, 12-18 degrees, 15-30 degrees, 38-42 degrees, or the like. For example, as the image diffusion angles become greater, the general illumination lighting distribution is affected. To mitigate the effects of the greater image diffusion angles on the general illumination lighting distribution, the image diffusion angle may be kept low (i.e., small). For example, larger image diffusion angles have a greater effect on the general illumination lighting distribution but allows for shorter distances Dd, while smaller image diffusion angles affect lighting distribution less but lead to larger distances Dd. The image diffuser 232 may be an isotropic, an anisotropic, a holographic, a ridged, a prismatic, an angle dependent diffuser or the like, in which case the distance Dd may be adjusted accordingly to attain the desired output image fill factor. In response to the predetermined image diffusion angle Δθ° of image diffuser 232, the image light is output from the image diffuser output 237 as a presented image at an output angle L1 approximately equal to the square root of $(\Delta\theta^2+\theta e^2)$.

The image light 257 output from the output of the image diffuser output 237 presents an image having a second image pixel fill factor, such as image 257A, to a viewer. It should be noted that the light is shown in FIG. 2 as being diffused in only two discrete directions, but the light is in fact directed in a number of directions. The second image pixel fill factor of the presented image, such as image 257A, is different from the first image pixel fill factor of the image, such as image 255, output from the display device. While the images 255A and 257A are examples of an automobile image, the images output by the image display device 220 or the image diffuser 232 may be images of any object, scene, person, event or graphic. In addition, the image may not only be stationary, but may be in motion or dynamic, such as a video or an animation.

The "pixel" size (of the pixelated image 255A) or perceived light emitter size depends on the diffusion angle (Δθ°), light emitter divergence (θe) angle (and size) entering the pixel. The pixel size and fill factor of the presented image light 257 can be adjusted using the parameters (Δθ°, θe, and Dd) as described in this and the following examples. For example, the "image pixel", such as 257P, size or perceived source size depends on the image diffuser 232 diffusion angle (Δθ°), source divergence (θe) angle (and size) entering the image diffuser 232, and the distance Dd between the respective emitters 1-N and the image diffuser 232. Based on an observer location that provides a view of the presented image light 257, the image 257A appears smooth as opposed to pixelated as image 255A. The observer's perception of image 257A is also influenced by the image light 255 that is scattered and/or, at higher angles, does not travel to the observer's location. The observer's aperture itself depends on many other factors such as the observer's aperture location (e.g., directly beneath, at an angle, or the like), distance from the image diffuser 232, the ambient light levels, and the like.

The processor 212 is coupled to the image display device 220. The processor 212 is configured to control the image light emitters 1-N of the image display device 220 to output image light 255. As will be explained in more detail with reference to FIGS. 3-7, the processor 212 may be further configured to receive an image input at the processor 212 input from an image source (not shown in this example). If the input image has a higher resolution image than can be presented by the image display device 220, the processor 212 may be configured to utilize image processing techniques to reduce the resolution of the higher resolution input image. The image source may, for example, be a memory (not shown in this example) in the processor, a database (not shown in this example) coupled to the processor or coupled via a network (not shown in this example) to the processor 212, examples of which will be described in more detail with reference to other examples.

Figure 2B:
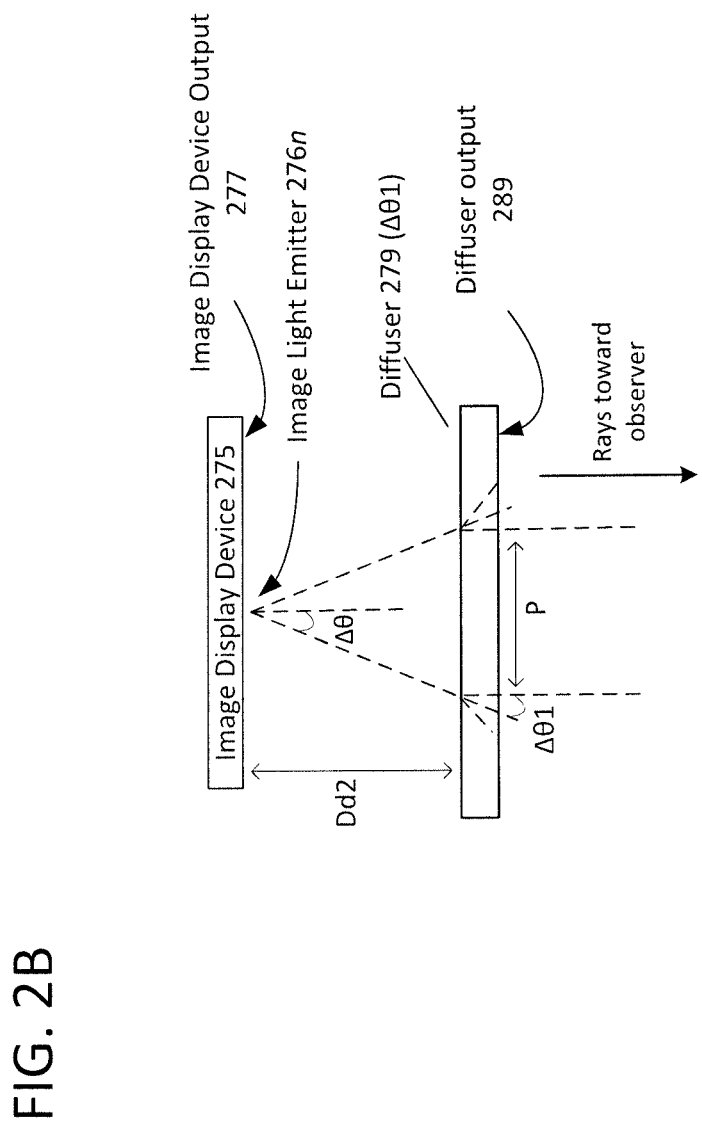
FIG. 2B illustrates an example of a relationship between an emissive display and a diffuser to provide fuzzy pixels as described herein.

FIG. 2B illustrates an example of a relationship between an image display device 275 and a diffuser 279 to provide fuzzy pixels. The image display device 275 may have a number of image light emitters, such as image source 276n. The image light emitters 276n may have a preset light distribution, such as 2Δθ, and have a brightness that is either preset or controllable. The image light emitters, such as 276n, of the image display device 275 may be arranged to have a pixel pitch (e.g. 5 mm, 8 mm, 10 mm, 25 mm or the like) that may be pixelated when presenting an image at the output 277 of the image display device 275 due to the emitted image light forming the image pixel that does not fill the entire space between image light emitters, or in other words, does not fill the pixel pitch. As a result, the image presented at the image display device output 277 may be pixelated or aliased due to the reduced pixel fill factor of the image light emitters, such as 276n.

The diffuser 279 is configured to extend the fill factor of the image light. The perceived fuzzy pixel size P may be a function of brightness of the image light emitter 276n, distribution angle of the image light emitter 276n, distance Dd2 of the image light emitter 276n to the diffuser 279, the diffusion angle Δθ1 of the diffuser 79, and other factors, such as a configuration of the diffuser 279 with regard to the scattering of the image light at different angles. For example, the diffuser 279 may be manufactured such that it only diffuses light received from a certain angle. The diffuser 279 may have a diffusion angle of Δθ1. In general, the diffuser 279 may have a distribution similar to a Gaussian curve, a sinusoidal curve, or the like.

The apparent size of the light emitter 276n through the diffuser 279 as perceived by an observer due to scattering (produced by the diffuser 279) is a function of at least the diffuser 279 diffusion angle Δθ1, distance Dd2 to diffuser, and image light emitter distribution Δθ.

In an example, assume an observer is far away (relative to the distance Dd2) such that the observer only sees collimated light at the diffuser output 289. In such a case, the observer perceives the fuzzy pixel size P of the image presented at the diffuser output 289 to be substantially equal to the pixel pitch of the image light emitter 276n. As a result, the image at the diffuser output 289 is smoothed and does not appear as pixelated or aliased as the image output from the image display device output 277.

The following approximate calculations are provided to enhance the understanding of the reader. The fuzzy pixel size is roughly calculated here as the source size perceived by an observer sufficiently far away from the diffuser output 289, and is viewing the device on-axis. We assume that the observer is only looking at collimated light leaving the diffuser output 289. This is generally not true the eye aperture changes constantly based on the pupil opening, which depends on a host of other issues outside the scope of this application. For simplicity, we will assume that when the observer is far away, the angles collected are small enough such that the perceived pixel size is simply the area at the diffuser output 289 that sends collimated light towards the observer (on-axis in this case), from a location at the output 289 corresponding to the emitter 276n. If the source angle $\Delta\theta$ is larger than the diffusion angle $\Delta\theta 1$, the fuzzy pixel size is determined by $\Delta\theta 1$, because then the diffuser will be able to scatter part of the source light towards the observer and the edge of the perceived pixel is simply the farthest location from which the diffuser can bend the light towards the observer, that determines the pixel size. The fuzzy pixel size P may be approximately $2 \times Dd2 \times \Delta\theta$ 1, where the distance Dd2 is approximately equal to P divided by $(2 \times \Delta\theta 1)$. Therefore if we desire that P is equal to the pixel pitch, the distance Dd2 for the diffuser can be calculated. If the source angle $\Delta\theta$ is smaller than the diffusion angle $\Delta\theta 1$, the fuzzy pixel size is determined by $\Delta\theta$, because then the source does not contain enough angles for the diffuser to scatter, and so the largest angle scattered towards the observer is determined by $\Delta\theta$. This also makes sense since if the source is a highly collimated laser, perceived pixel size may not depend on the diffuser, and only depends on the spot size exiting the source. The fuzzy pixel size P then may be approximately $2 \times Dd2 \times \Delta\theta$, where the distance Dd2 is approximately equal to P divided by $(2 \times \Delta\theta)$. Other specific diffusers, sources and the like may utilize different calculations. Usually, the dimensions of P are substantially equivalent or slightly larger than the pixel pitch of the image display device 275. These calculations are very approximate as they also assume that the light distribution from emitters is perfectly uniform across all angles which also isn't true. These expressions are a rough guideline and more accurate calculations may be performed for example using imaging optics simulators such as those provided by Zemax, LLC, or the like. This enables the image light output from the diffuser to essentially fill an image display so that substantially no gaps or no gaps at all appear between a first image pixel produced by one image light source and an adjacent image pixel produced by another image light source.

The fuzzy pixel size P directly corresponds the increased image pixel fill factor that is provided by the diffuser 279. As a result of the fuzzy pixel size P, the image pixel fill factor at the diffuser output 289 is greater than the image pixel fill factor output from the image display device 275.

Figure 3:
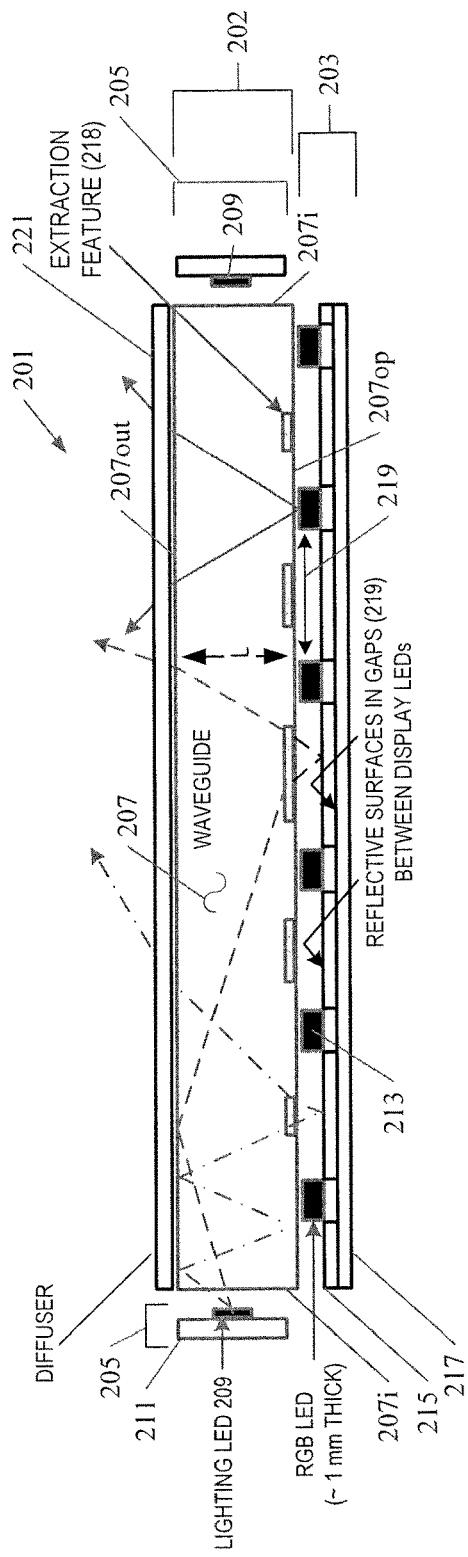
FIG. 3 is a side or cross-sectional view of a section of an edge lit type transmissive lighting device and an associated LED type emissive image display device.

FIG. 3 depicts an enlarged cross-sectional view of a luminaire 201, e.g. showing limited portions and/or numbers of relevant components. The drawings also show some representative examples of dimensions, although implementations of the luminaire 201 may exhibit other sizes/dimensions.

The source 205 of illumination light in the example includes a number of lighting LEDs 209, supported along the periphery of the waveguide 207 by one or more circuit boards 211. In a rectangular example like that shown, each of two circuit boards 211 support some number of the LEDs 209 along opposite lateral sides of the waveguide 207. In a typical LED based lighting element 202, the LEDs 209 may be white LEDs. In a tunable LED based lighting element 202, the LEDs 209 may be combinations of different types of LEDS, such as RGB (red/green/blue) LEDs, RBGW (red/green/blue/white) LEDs, or two or more types of white LEDs of different color temperatures. There may be only one LED, although as shown there typically are more LEDs 209. Other types of sources may be used, however, such as one or more organic light emitting diodes (OLEDs); one or more micro LEDs; one or more nanorod or nanowire LEDs; at least one fluorescent lamp; or at least one halogen lamp.

As noted, the luminaire 201 also includes the image display device 203. Display 203 in the example is an emissive type display device, in that the display 203 emits light of the image rather than reflecting light to represent the image. The display 203 includes a number of pixels. In the example, each pixel has a number emitters for controllable emission of a corresponding number of different colors of light, e.g. RGB or RGBW. Although an OLED display, plasma display or other type of emissive display may be used, the example image display device 203 uses a matrix of RGB LEDs 213. The LEDs 213 are supported by a grid 215, for example, at intersections of rows and columns of the grid 215. The grid 215 may be formed of suitable circuit board materials, to support the LEDs 215, provide connections to contacts of the LEDs as well also to run any necessary wiring from the drive circuitry to the LEDs 213. The circuit board(s) forming the grid 215 may also support some or all of the image display driver circuitry (not shown in this example). The image display 203 is coupled to supply light of the selectable image to at least the waveguide 207 of the body of the luminaire 201 for output as a visible image via the luminaire 201.

Light waveguides, also sometimes referred to as "light guides" or "light pipes," are known in the lighting arts. A light waveguide, such as 207, utilizes internal reflections governed by Snell's Law. A light waveguide may be fabricated of a clear light transmitting material, such as clear plastic or glass or acrylic, having opposing surfaces (top and bottom surfaces in the drawing) between which the light is internally guided. The waveguide 207 body also includes one or more lateral surfaces through which light can be introduced into the guide from one or more light sources coupled to the 'edge' surface(s). Because of the high angle of incidence (angle from an axis perpendicular to the respective surface) of light rays at the longitudinal surfaces of the waveguide body, the light rays will internally reflect off of these surfaces and consequently will not escape the waveguide 207. In this way, the internal reflections, at longitudinal surfaces of the waveguide structure, channel or guide light introduced at one or more lateral or peripheral surfaces along the body of the waveguide 207, often without emerging from the waveguide's lateral surfaces except at desired specially configured output locations.

In the example of FIG. 3, the light waveguide 207 therefore has a light transmissive body, an output surface 207*out* on the waveguide body, and an opposing surface 207*op* on the waveguide body opposite the output surface.

The lighting LEDs 209 of the illumination light source 205 are optically coupled to supply illumination light to the waveguide 207 via one or more waveguide input surfaces 207*i* for emission from the waveguide 207 via the output surface 207*out* as light for an illumination application of the luminaire. FIG. 3 shows dotted line/arrow examples of just few of the illumination light paths from a LED 209 on the left side of the drawing, through the waveguide 207 and out via the output surface 207*out*.

In the illustrated example, the body of the waveguide is at least substantially planar. In the specific example shown, the longitudinal output surface 207*out* and the longitudinal opposite surface 207*op* are planar surfaces that are actually parallel to each other, although there may be some minor deviation due to the process of forming those surfaces of the material forming the body of the waveguide 207. There may also be applications in which either one or both surfaces on the body of the waveguide 207 has a non-planar contour, such as concave, convex or exhibiting a recurring waveform (e.g. sinusoidal or sawtooth).

One or more lateral waveguide input surfaces 207*i* extend along a periphery of the waveguide body including along at least a portion of each of the output surface 207*out* and the opposing surface 207*op*. Each waveguide input surface 207*i* extends between an edge of the output surface 207*out* and an edge of the opposite surface 207*op* along a portion of the periphery of the planar body of the waveguide 207. Various types of optical coupling techniques may be used along the waveguide input surface 207*i* to optimize the efficiency of extraction of light from the LEDs or the like forming the source 205 and coupling of such extracted light into the body of the waveguide 207. For example, the lighting element 202 may have an index of refraction matching material in between the emitter output of each LED 209 and a corresponding region of the light input surface 207*i* of the waveguide 207. The index of refraction of the material matches the index of refraction of the solid material (e.g. glass or acrylic) of the body of the waveguide 207. It may also be helpful to contour points on the light input surface 207*i*, e.g. with appropriate dimples, to conform to and provide improved optical coupling to the emissive surface of each illumination LED 209.

Light rays hitting a longitudinal surface 207*out* or 207*op* at an angle of incidence (relative to a line or axis perpendicular to the surface) greater than a critical angle of the particular material/structure of the waveguide 207 is reflected back within the waveguide 207, by total internal reflection (TIR). Light rays hitting a longitudinal surface at an angle of incidence less than the critical angle pass through the surface. In a pure waveguide arrangement, light introduced into the waveguide 207 on or about a line between and essentially parallel to the surfaces 207*out*, 207*op* of the waveguide (e.g. from emitters at locations similar to those shown for LEDs 213) may reflect one or more times and remain within the waveguide 207 across the entire longitudinal extent of the waveguide. If the opposite end of the waveguide also is reflective, light is reflected back and repeats the TIR channeling back in the opposite direction. For lighting applications or the like, features can be provided along one or both surfaces that change the reflective characteristic of the surface and the critical angle; and/or features provided along one or both surfaces may change the angle of light reflection within the waveguide and thus change the next angle of incidence of a light ray on a surface.

The example luminaire 201, with the incorporated image display device 203, utilizes a combination of extraction features 218 aligned with gaps 219 between the display LEDs 213 forming the pixels of the matrix of the display 203 and diffuse reflectivity on portions (other than the LEDs 213) of the image display device 203.

The extraction features 218 in or associated with the waveguide 207 are aligned with the gaps 219, although the extraction features may not fully cover the respective gaps 219. The extraction features 218 may take the form of a treatment or structure formed in the waveguide 207 at the surface 207*op*, in appropriate regions of that surface 207*op* (hence, the illustration of the features 218 as being located within the waveguide 207 along and abutting the surface 207*op*). Extraction features could be frits produced by etching or the like, prismatic features, lens structures formed in or coupled to the surface, etc. formed in or located in an appropriate pattern along regions of the output surface 207*op* of the waveguide 207. The waveguide 207 thus may be described as a "patterned waveguide" with extraction features 218 of the pattern aligned with gaps 219 in the pixel matrix of the LED display 203. Other extraction technologies may be mounted on the outside of the waveguide 207 at appropriate locations on the surface 207*op*. The extraction features 218 break the TIR condition at the output surface 207*op* and allow light to couple out of waveguide 207, in this example, for reflection from reflective surfaces in the gaps (219) between display LEDs 213.

The reflectivity in the gaps 219 between the LEDs 213 at the pixels of the display 203 may be implemented in a variety of ways. In the example, surfaces of the column and row members of the grid 215 facing toward the surface 207*op* of the waveguide 207 may be reflective, e.g. coated with a reflective layer. In such an implementation, spaces between the column and row members of the grid 215 could be filled with a reflective material; or as in the example, the grid 215 may be backed by or supported on a suitable reflective element 217, such as a circuit board with a reflective coating layer on the surface (or surface portion(s)) thereof facing toward the surface 207*op* of the waveguide 207. The reflective material is highly reflective, for optimum efficiency; and the reflective material may be highly diffuse (e.g. Lambertian). For further discussion purposes, we will assume that the reflective material(s) forming the reflective element 217 provide white/diffuse reflectivity.

As outlined above, the illustrated example of the image display device 203 uses a grid 215 to support the LEDs 213. Other arrangements/configurations may be used to implement the LED based display. For example, the LEDs 213 may be mounted directly on a reflective board 217 (without the grid 215). In such an alternative implementation, wiring and possibly other circuitry may be provided on a back surface or on another board and connected to the LEDs 213 by conductors through vias extending through the board 217. In another approach, wiring lines connecting to the LEDs 213 may extend across the surface of the board 217 but be covered with a reflective layer in the areas where the LEDs are not mounted to the board. The number of LEDs 213 may output image light that forms at an output of the opposing surface 207*op* of the lighting element 202 an image having a first image pixel fill factor.

For example, a light ray from within the waveguide 207 hits an extraction feature 218 and passes through the surface 207*op*. The extraction feature 218 diffuses the ray as the ray passes through the surface 207*op*. Light the emerges through the surface 207*op* reflects off of the reflective surfaces in gaps (219) between display LEDs. This reflection may also tend to diffuse the light. The reflected light passes back through the feature 218 and may pass through other portions of the surface 207*op* into and through the transmissive body of the waveguide 207. Much of the reflected light has a smaller angle of incidence when transmitted through the waveguide 207 to the output surface 207*out*; and as a result, such light passes through surface 207*out* as illumination light output of the luminaire 201.

The extraction features 218 are distributed about the surface 207*op* and/or configured so as to promote uniform intensity output of the illumination light from the output surface 207*out* of the waveguide 207. For example, there typically is a space along each peripheral edge of the surface 207*op* that is free of any extraction feature, which helps mitigate against the appearance of high intensity ("hot spot") bands or regions along the edges of the output surface 207*out* of the waveguide 207. It may also be helpful to use features 218 of different sizes aligned with gaps 218 at different locations along the surface 207*op*, to increase uniformity of illumination light output. In the example, features 218 near the lateral edges adjoining the illumination light input surface are relatively small and fill less of the area corresponding to respective gaps 217. Approaching the center of the length (longitude) of the waveguide body, the size of the features 218 increases so as to fill more of the areas corresponding to respective gaps 217. In addition or instead of features of different sizes, the features at different locations across the surface may differ as to other extraction-related characteristics, e.g. more or less surface roughness (such as rougher features towards the middle).

Repeated light reflections, with attendant losses, within the waveguide 207 reduce the overall efficiency of the luminaire 201. The display LEDs 213 typically are not reflective, with respect to light from the opposite waveguide surface 207*op*, which leads to some loss of illumination light. Also, some light reflected from the reflective surfaces in gaps (219) between display LEDs 213 may reflect back off of the features 218 and/or areas of the surface 207*op*. Each reflection incurs some loss of illumination light. These losses between the waveguide surface 207*op* and the LEDs and reflective surfaces of the image display device 203 reduce the overall efficiency of the luminaire 201. Design of the elements of a luminaire may be optimized and/or additional technologies added to reduce such losses and improve overall illumination efficiency of the luminaire.

The diffuser 221 further helps to homogenize output light for both illumination and image display. The diffuser 221 may an output diffusion angle coupled to the output surface of the lighting element 202 to allow the image light and the general illumination light to pass to an area to be illuminated and presented with the image. As shown in the drawing example, the diffuser 221 may be a separate sheet or layer, e.g. of a suitable white translucent material, adjacent to or formed on the output surface 207*out* of the waveguide 207. The diffuser 221, however, may be formed in other ways, for example, e.g. as frit produced by etching or the like, prismatic features, lens structures formed in or coupled to the surface, etc. across the output surface 207*out* of the waveguide 207.

For illumination, the diffuser 221 diffuses the illumination light output through the surface 207*out*, which improves uniformity of illumination light output intensity, as may be observed across the output through the surface 207*out* and/or as the illumination light is distributed at a working distance from the luminaire (e.g. across a floor or desktop).

For display, the diffuser 221 diffuses the image light from image display device 203 that has passed through the transmissive body of the waveguide 207. For some types/ resolutions of the display, some degree of diffusion may be tolerable or even helpful. Use of higher resolution data to drive such an implementation of the image display device 203 may cause the image output to become pixelated. In some cases, the pixelation may prevent a person from perceiving the intended image on the image display device 203. Processing of the image data before application thereof to drive the pixel emitters of the image display device 203 and/or blurring of the output image by the diffuser 221 effectively increase the image fill factor to eliminate or substantially mitigate pixelation of an image output from the image display device 203. Such an increase in the fill factor in the output image may increase an observer's ability to perceive or recognize the output image. An implementation of such a fuzzy pixels approach in a system may be implemented to reduce the impact of low resolution image output on some types of display devices.

Implementation of the luminaire 200 in a system, like system 109, would include circuitry like 113 coupled to the LEDs 209 of the source 205 and to the LEDs 213 of the image display device 203 to drive and control operation of the source 205 and the image display device 203. In a manner similar to earlier discussions, the circuitry is configured to operate the luminaire 201 to generate the illumination light during an illumination state of the luminaire 200, and to operate the image display device 203 to emit the light of the image during an image display state of the luminaire 200.

Figure 4:
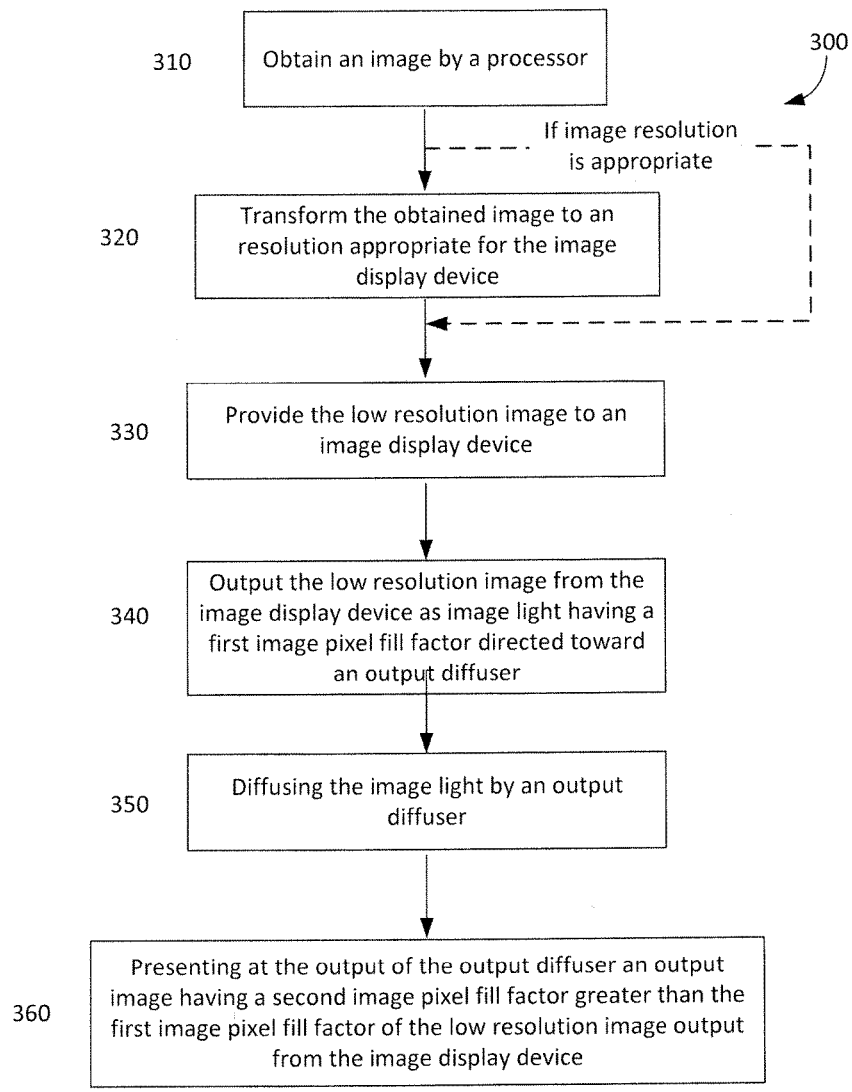
FIG. 4 is an example of a high-level process flow involved in processing an image display device.

The luminaire 201 may be configured, based on the diffuser output diffusion angle, the predetermined distance L between opposing surface 207*op* and the output surface 207*out* of the lighting element 202, and the first fill factor, to output image light from the diffuser 221 that has a second fill factor that is greater than the first fill factor;

The processed performed by the processor 212 of FIG. 2A may be explained in more detail with reference to the flow chart of FIG. 4. FIG. 4 is an example of a high-level process flow involved in a transformation of an image display device. The process 300 may be performed by the apparatus 200 or may be performed by devices illustrated in FIGS. 5-8 that incorporate one or components of the apparatus 200.

At 310 of the process 300, a high resolution image may be obtained (e.g., received as an input) by a processor, such as 212, configured to perform image processing functions. As will be explained with reference to FIG. 4, the processor may be coupled to a lighting device. At 320, the obtained image may be transformed into a low resolution image that has a first image pixel fill factor. For example, the obtained image may be an image having a resolution higher than the resolution of the display device. In such a case, the obtained image is a high-resolution input image. The high-resolution input image may be transformed, for example, by being resized and down-sampled into a lower resolution image for output at a resolution of an image display device coupled to the processor. For example, when down-sampling the high resolution image, the processor may utilize any number of filtering techniques to increase the efficacy of the pixelated effect generated by the resizing and down-sample filtering the image. The down-sample filtering may include selecting a down-sample filter setting to be applied to the image to achieve image resolution appropriate for the image display device. For example, image filters such as linear, bilinear, trilinear, anisotropic, nearest neighbor, bicubic or the like may be used when down-sampling the obtained image. Different image filters may be used for different types of images. For example, a bicubic filter may be used when the image is textual, while a nearest neighbor filter may be used if the image contains a large amount of high frequency content.

In an alternative example (as shown by dashed arrow), at 310, the obtained image have a resolution that substantially matches the resolution of the image display device. In other words, the obtained image may be a low resolution image appropriate for output from the image display device. As a result, the processor may bypass step 320 and provide the obtained low resolution image directly to the image display device.

Returning to step 320 at which the obtained image is transformed into a lower resolution image. In order to transform the image to low resolution image, the processor may down-sample the obtained image. For example, the processor may select a down-sample filter setting from one or more filter settings stored in a memory (described in a later example) to be applied to the image to achieve the image resolution at the output of the image display device for presentation to an output diffuser. For example, a diffusion angle of the image diffuser is determined based on the fill factor of the image to be output from an image display device, the desired second image light distribution, and the desired diffuser distance Dd. Or alternatively, depending upon an intended application of the apparatus including the image display device, the processor may select a down-sample filter setting to be applied to the obtained image to achieve an image pixel fill factor based on a diffusion angle output of general illumination light from the general illumination light emitter, a diffusion angle of the image diffuser, and a divergence angle ($\theta e$) of image light output from the image display device.

After transformation of the obtained image into a low resolution image, the low resolution image may be output from the processor, and provided at 330 to the image display device.

The low resolution image, at 340, is output from the image display device as image light directed toward an image diffuser, such as image diffuser 232 of FIG. 2. The image diffuser may diffuse the image light (350). For example, the image diffuser may change the image pixel fill factor of the image light to a second image pixel fill factor based on a distance between the image display device and the image diffuser. The second image pixel fill factor may be, for example, different from the first image pixel fill factor of the low resolution image output from the image display device At the output of the image diffuser, an output image may presented having a second image pixel fill factor greater than the first image pixel fill factor of the low resolution image output from the image display device (360). The outputted image may be a smoothed image that has a second image pixel fill factor. Thus, a smoothed image is presented at the output of the image diffuser.

In some examples, the general illumination light emitter is positioned within the lighting device proximate to the image display device. In such an example, general illumination light from a general illumination light emitter may be output from the output diffuser in addition to the presented output image from the output diffuser.

Image displays that use liquid crystals (LC) as an element of the display usually suffer high optical losses. For example, the final light output is usually less than 10% of what was originally produced by the general illumination light emitters. This reduces the efficiency of an image display to the extent that the display's illumination efficiency cannot compare with standard luminaire efficiencies which are in the range of 100 lumens/watt. In fact, most LCD based image displays cannot perform better than 10 lumens/watt. In other words, the general illumination performance of a conventional LCD based image display does not satisfy minimal lighting requirements set by building codes or industry standards, such as Illuminating Engineering Society (IES) and American National Standards Institute (ANSI) standards. Other display technologies, such as projection displays, LED-LCD or plasma displays are optimized for the display function and offer poor illumination efficiency, and thus are similarly unsuited to general lighting. In addition, many displays usually use combinations of narrow bandwidth emitters as the sources, therefore the light output is not spectrally filled as one would expect from a typical white light luminaire. This directly relates to metrics such as CRI and R9. As a result, an image display alone is a poor substitute for a standard luminaire regardless of the type of image display (e.g., LCD, Plasma, LED or the like).

Beam shape is another issue when using an image display for lighting purposes. Luminaires, which are typically mounted in ceilings, are specifically designed to cover the lighting solid angle appropriate to throw light on a work surface or the like within a room. For example, downlights have a narrow beam cone, while other lights may disburse the light over a wider area of the room. Conversely, image displays are designed with the intention of covering a broad viewing angle. The light output by an image display at the broad viewing angle is considered wasteful from a luminaire's perspective. For this additional reason, image displays are not typically considered as effective alternatives to a dedicated light fixture for general lighting purposes. Therefore, the apparatus 200 alone is not sufficient to provide general illumination as described above. Hence, general illumination lighting components in addition to the image light emitters 1-N of FIG. 2 may be utilized in a lighting device incorporating apparatus 200.

Figure 5A:
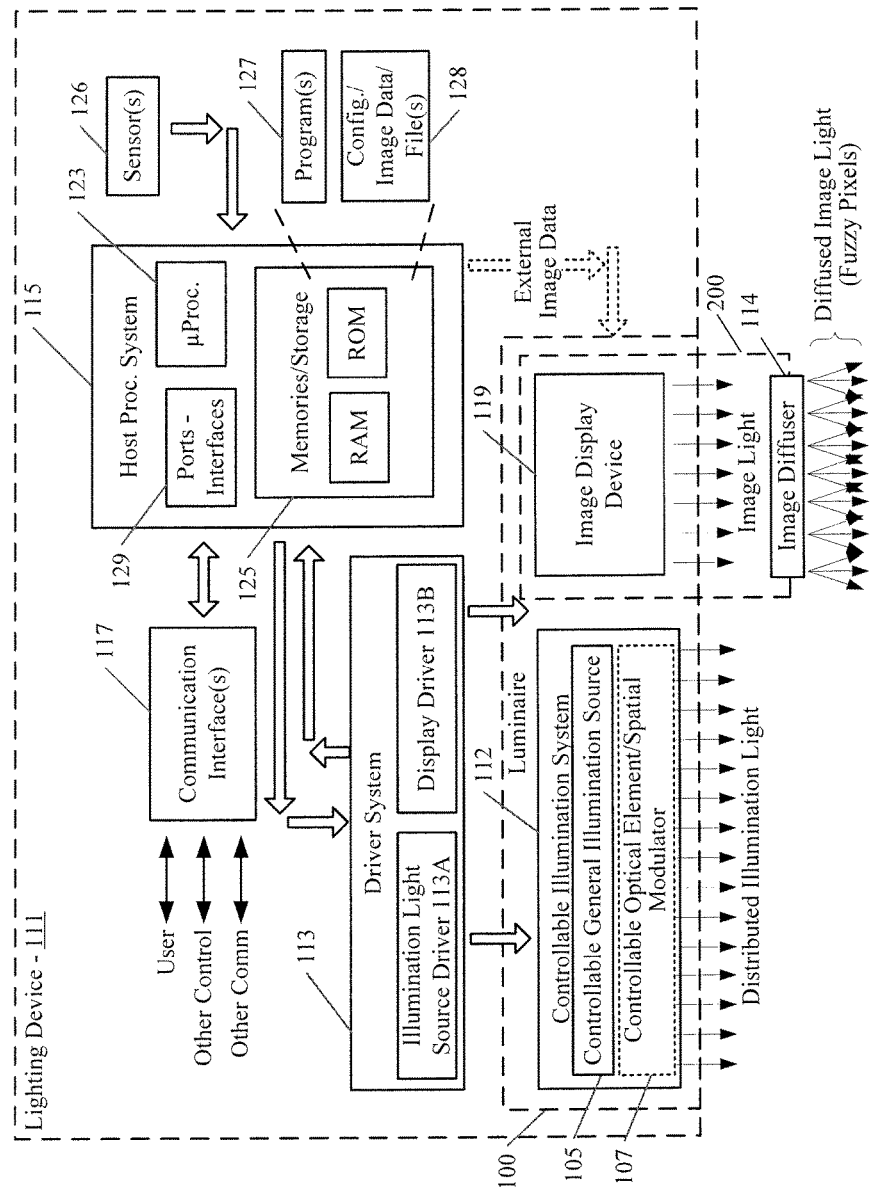
FIG. 5A is a functional block diagram of a controllable lighting device, e.g. include a luminaire with an apparatus that outputs a diffused image and a general illumination device/system.

A more detailed example of a lighting device that includes components of the apparatus 200 is shown in FIG. 5A. FIG. 5A is a stylized view of a controllable lighting device depicting a relationship between an image display device and a general illumination device as well as a relationship between a display pixel of the image display device and an illumination pixel of the general illumination device.

In addition details of the apparatus 200 and the lighting device 111 will be described in more detail with reference to the following examples and drawing figures.

The lighting device 111 of FIG. 5A includes a luminaire 100 of the type under consideration here. For illustration and discussion purposes, the luminaire 100 of the lighting device 111 includes a controllable illumination system 112 that includes one or more light source components forming a general illumination light source 105 and optionally may include other components for controlling the illumination light output of the light source(s)/device, such as the illustrated controllable optical/spatial modulator 107. The luminaire 100 of the lighting device 111 also includes a display apparatus 200 that includes an image display device 119 and an image diffuser 114.

As shown in FIG. 5A, the controllable illumination system 112 provides general illumination lighting in response to control signals received from the driver system 113. Similarly, the image display device 119 of apparatus 200 provides image light in response to control signals received from the driver system 113. In addition or alternatively, the image data may be provided to the image display device 119 from an external source(s) (not shown), such as a remote server or an external memory device via one or more of the communication interfaces 117.

A general illumination light emitting array 105 comprising one or more light emitters (not shown in this example). The general illumination light emitting array 105 is configured to generate general illumination light that provides general illumination to the area in which the lighting device is located.

The functions of elements 112 and 119 are controlled by the control signals received from the driver system 113. The driver system 113 may be an integral unit generating appropriate drive signals for operation of the light source(s) and any other components of the controllable illumination system 112 and of the image display device 119; or as illustrated, the driver system 113 may include an illumination light source driver 113A coupled to provide drive signal(s) to operate the general illumination light source(s) and any other components of the controllable illumination system 112 and a separate image display driver 113B to provide drive signals to operate the image display device 119. The controllable illumination system 112, the controllable optical/spatial modulator 107, and the illumination light source driver 113A may provide signals to control the actual component(s) of the source 105 and to control the components of the modulator 107, or there may be separate drivers for the source and modulator.

The image display device 119 of apparatus 200 may be a commercial-off-the-shelf, low resolution image display device or a custom built low resolution display device. Light from the source(s) 105 and any optics forming the general illumination system 112 alone or in combination with image output light from the image display device 119 provides general illumination lighting that complies with governmental building codes and/or industry lighting standards, such as Occupational safety and Health Administration (OSHA), Illuminating Engineering Society (IES) and American National Standards Institute (ANSI) standards. The image display device 119 is located proximate to the general illumination light emitting array 105. The image display device 119 is configured to output image light representing a low-resolution image to be presented to the area in which the luminaire 100 is illuminating. The presented image may be a real scene, a computer generated scene, a single color, a collage of colors, a video stream, animation or the like. The controllable illumination system 112 of luminaire 100 may be an otherwise standard general illumination system, which is co-located with the image display device 119, and that includes one or more light sources that provide general illumination that satisfies the governmental building codes and/or industry lighting standards.

In an example, the image diffuser 114 is configured to pass the image light output from image display device 119. The image diffuser 114 is positioned a distance from the image display device 119. The distance, as described above, between the image display device 119 and the image diffuser 114 may, for example, be a predetermined distance that is determined based on a predetermined image presentation criteria, such as a particular smoothness or a particular image pixel fill factor for a presented image. For example, as described above with reference to FIG. 2A, the smoothness criteria may be determined to provide a desired image pixel fill factor of the image presented by the diffused image light, or fuzzy pixels, to an observer of the output diffuser.

The smoothness of an image may be quantified using different metrics calculated using, for example, a modulation transfer function (MTF), a subjective quality factor (SQF) function, or the like. The obtained values may be used to quantify the smoothness based on how a comparison of the image output from the output diffuser to the low resolution, pixelated image. Alternatively, a Fourier transform of the low resolution, pixelated image and a Fourier transform of the output image from the output diffuser may be used to quantify the smoothness based on the spatial frequency coefficient values provided by the Fourier analysis. The results of the Fourier analysis may be used to determine whether the output image is appropriately smooth for a particular image display application, e.g., signage, content delivery, or the like, or a user desired smoothness for aesthetic purposes.

As shown in FIG. 5A, the example 111 of the lighting device includes a host processing system 115, one or more sensors 121 and one or more communication interface(s) 117.

The host processing system 115 provides the high level logic or "brain" of the lighting device 111. The host processing system 115 upon execution of programming code may be configured to perform the functions of processor 212, such as those described above with reference to FIGS. 2A and 3. In the example of FIG. 5A, the host processing system 115 includes data storage/memories 125, such as a random access memory and/or a read-only memory, as well as programs 127 stored in one or more of the data storage/memories 125. The programs 127 may include image processing programs that enable the host processor 115 to perform the resizing and down-sampling described above. The data storage/memories 125 store various data, including information about the image display device 119 lighting device configuration/image data/files 128 or one or more configuration/image data files containing such information, in addition to the illustrated programming 127. The image files 128 may be an image source from which the processor 115 obtains image data for presentation as a low-resolution image output from the image display device 119. The host processing system 115 also includes a central processing unit (CPU), shown by way of example as a microprocessor (µP) 123, although other processor hardware may serve as the CPU.

The ports and/or interfaces 129 couple the processor 123 to various elements of the device 111 logically outside the host processing system 115, such as the driver system 113, the communication interface(s) 117 and the sensor(s) 121. For example, the processor 123 by accessing programming 127 in the memory 125 controls operation of the driver system 113 and other operations of the lighting device 111 via one or more of the ports and/or interfaces 129. In a similar fashion, one or more of the ports and/or interfaces 129 enable the processor 123 of the host processing system 115 to use and communicate externally via the interface(s) 117; and the one or more of the ports 129 enable the processor 123 of the host processing system 115 to receive data regarding any condition detected by a sensor 121, for further processing.

In the operational examples, based on its programming 127, the processor 123 processes data retrieved from the memory 123 and/or other data storage, and responds to light output parameters in the retrieved data to control the light generation and optionally the light distribution from illumination system 112. The light output control also may be responsive to sensor data from a sensor 121. The light output parameters may include light intensity and light color characteristics of light from source 105 in addition to spatial distribution control via modulator 107 (e.g. steering and/or shaping and the like for achieving a desired spatial distribution).

As noted, the host processing system 115 is coupled to the communication interface(s) 117. In the example, the communication interface(s) 117 offer a user interface function or communication with hardware elements providing a user interface for the device 111. The communication interface(s)

117 may communicate with other control elements, for example, a host computer of a building control and automation system (BCAS). The communication interface(s) 117 may also support device communication with a variety of other equipment of other parties having access to the lighting device in an overall lighting system, e.g. equipment of the manufacturer of lighting device 111 for maintenance or an on-line server for downloading of programming instruction or configuration data for setting aspects of luminaire operation. The communication interface(s) 117 may also receive images for presentation by the image display device 119. The received images may require transformation as described previously, or may not.

As outlined earlier, the host processing system 115 also is coupled to the driver system 113. The driver system 113 is coupled to the general illumination light source 105 and, if present, the spatial modulator 107 to control one or more operational parameter(s) of the light output generated by the source 105 and to control one or more parameters of the modulation of that light by the spatial modulator 107. Although the driver system 113 may be a single integral unit or implemented in a variety of different configurations having any number of internal driver units, the example of system 113 may include separate general illumination source driver circuit and spatial modulator driver circuit (not shown) and a separate image display driver. The separate drivers may be circuits configured to provide signals appropriate to the respective type of light source 105 and/or modulators 107 of the general illumination system 112 utilized in the particular implementation of the device 111, albeit in response to commands or control signals or the like from the host processing system 115.

The host processing system 115 and the driver system 113 provide a number of control functions for controlling operation of the lighting device 111. In a typical example, execution of the programming 127 by the host processing system 115 and associated control via the driver system 113 configures the lighting device 111 to perform functions, including functions to operate the general illumination light source 105 to provide light output from the lighting system 112 and to operate the spatial modulator 107 to steer and/or shape the light output from the general illumination light source 105 so as to distribute the general illumination light output from the lighting device 111 based on the lighting device configuration information 128.

In an example of the operation of the lighting device 111, the processor 123 receives a configuration file 128 via one or more of communication interfaces 117. The processor 123 may store, or cache, the received configuration file 128 in storage/memories 125. In addition to the configuration file 128, the processor 123 may obtain from the storage/memories 125 or a remote device via the communication interfaces 117 an image for display on the image display device 119. The processor 123 may be configured to transform the obtained image based on characteristics, such as image resolution, spatial frequency, intensity and the like, an obtained general illumination setting, the approximate distance between the general illumination source 105 and the image diffuser 114, and/or the approximate distance between the image display device 119 and the image diffuser 114 to provide an image having a resolution corresponding to the image display device 119. After transformation of the image, the processor delivers the transformed image to the image display device 119.

The configuration file 128 includes configuration data that indicates, for example, an image for display by the image display device 119 as well as lighting settings for light to be provided by the controllable illumination system 112. Each configuration file may also include general illumination setting to set the light output parameters of the controllable illumination system 112, at least with respect to one or more operational parameters for the controllable general illumination source 105 and possibly optical/spatial modulation parameters (e.g. regarding angle a shape) for control of the modulator 107, if present.

Using the data indicating the image to be obtained from the storage/memories 125, the processor 123 may retrieve from storage/memories 125 an image that has either been processed by the processor 123 as described above with reference to FIGS. 2 and 3, or has been provided as a low resolution image for presentation by the image display device 119. The processor 123 delivers the image data to the driver system 113. The driver system 113 may deliver the image data directly to the image display device 119 for presentation or may have to convert the image data into a signal or data format suitable for delivery to the image display device 119. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like. For example, if floating point precision is needed, options are available, such as OpenEXR, to store 32-bit linear values. In addition, the hypertext transfer protocol (HTTP), which supports compression as a protocol level feature, may also be used.

A controllable lighting device such as 111 may be reconfigured, e.g. to change the image display output and/or to change one or more parameters to the illumination light output by changing the corresponding aspect(s) of the configuration data file 128, by replacing the configuration data file 128, retrieving different image data from memory 125, or by selecting a different file from among a number of such files already stored in the data storage/memories 125.

In other examples, the driver system 113 is coupled to the memory 125, the image display device 119 and the controllable illumination system 112 to control light generated by the image display device 119 and the controllable illumination system 112 based on the configuration data 128 stored in the memory 125. In such an example, the driver system 113 is configured to directly access configuration data 128 stored in the memory 125 and generate control signals for presenting the image on the image display device 119 and control signals for generating light for output from the general illumination system 112.

A lighting device 111 may be programmed to transmit information on the light output from the luminaire 100. Examples of information that the device 111 may transmit in this way include a code, e.g. to identify the luminaire 100 and/or the lighting device 111 or to identify the luminaire location within a premises or area. Alternatively or in addition, the light output from the luminaire 100 may carry downstream transmission of communication signaling and/or user data. The data transmission may involve adjusting or modulating parameters (e.g. intensity, color characteristic or distribution) of the general illumination light output of the illumination system 112 or an aspect of the light output from the image display device 119. Transmission from the image display device 119 may involve modulation of the backlighting of the particular type of display device. Another approach to light based data transmission from the image display device 119 may involve inclusion of a code representing data in a portion of a displayed image. The modulation or image coding typically would not be readily apparent to a person in the illuminated area observing the luminaire operations but would be detectable by an appropriate receiver. The information transmitted and the modulation or image coding technique may be defined/controlled by configuration data or the like stored in the memories/storage 125. Alternatively, user data may be received via one of the interfaces 117 and processed in the device 111 to transmit such received user data via light output from the luminaire 100.

Equipment implementing functions like those of configurable lighting device 111 may take various forms. In some examples, some components attributed to the lighting device 111 may be separated from the controllable illumination system 112 and image display device 119 of the luminaire 100. For example, a lighting device may have all of the above hardware components on a single hardware device as shown or in different somewhat separate units. In a particular example, one set of the hardware components may be separated from one or more instances of the controllable luminaire 100, such that the host processing system 115 may run several luminaires having displays, illumination light sources and possibly modulators from a remote location. Also, one set of intelligent components, such as the microprocessor 123, may control/drive some number of driver systems 113 and associated controllable luminaires 100. It also is envisioned that some lighting devices may not include or be coupled to all of the illustrated elements, such as the sensor(s) 126 and the communication interface(s) 117.

In addition, the luminaire 100 of each lighting device 111 is not size restricted. For example, each luminaire 100 may be of a standard size, e.g., 2-feet by 2-feet (2×2), 2-feet by 4-feet (2×4), or the like, and arranged like tiles for larger area coverage. Alternatively, one luminaire 100 may be a larger area device that covers a wall, a part of a wall, part of a ceiling, an entire ceiling, or some combination of portions or all of a ceiling and wall.

Lighting equipment like that disclosed in the examples of FIG. 5A, may have alternate configurations that combine the general illumination light sources with image display device emitters to provide general illumination and image light. The general illumination output from the combined general illumination light sources and image display device emitters for an intended area of a space meets the governmental and/or industry standards, e.g. OSHA, IES, or ANSI, described above for the intended area.

Figure 5B:
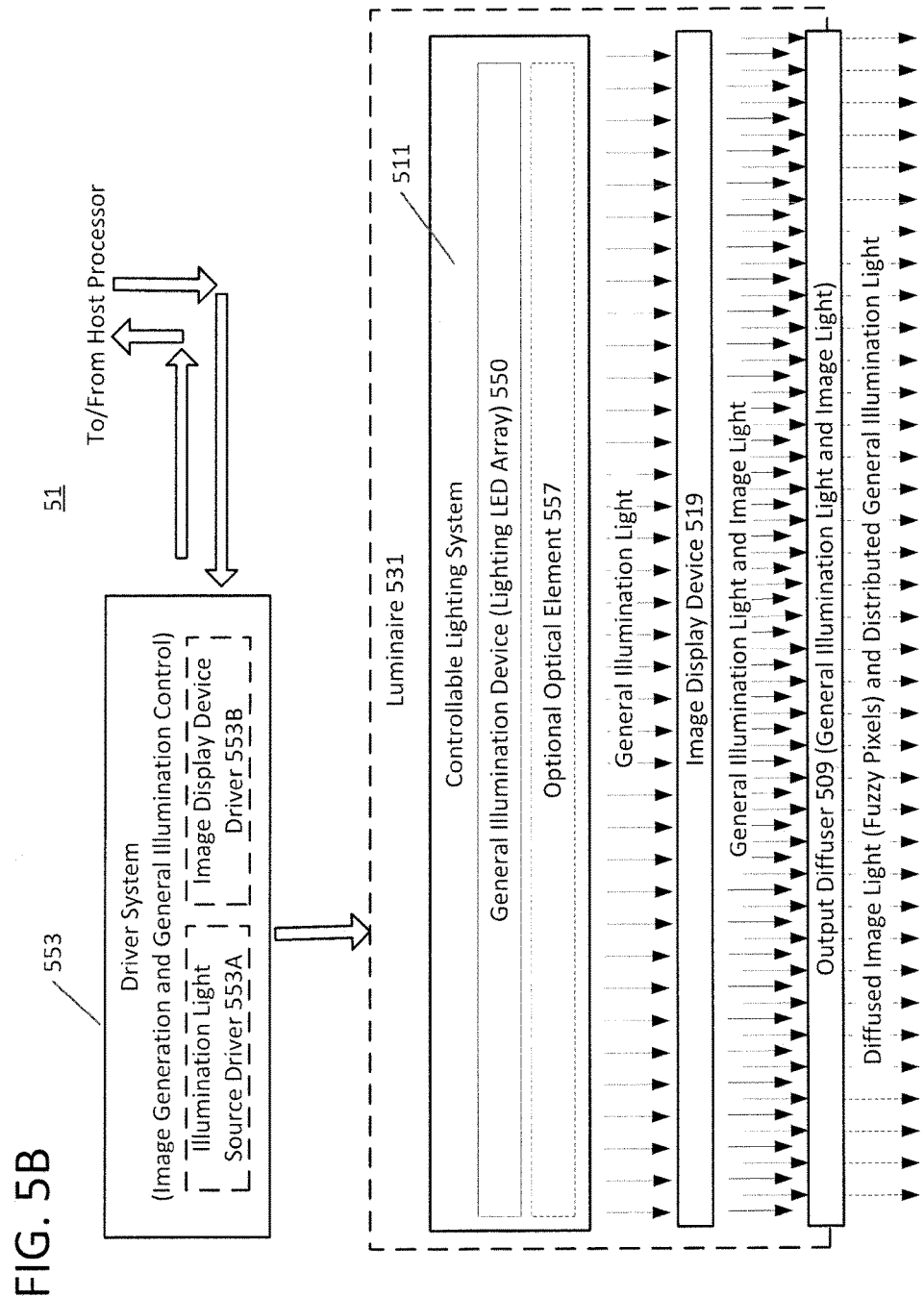
FIG. 5B is an example of a driver system and luminaire usable in the controllable lighting device of FIG. 5A.

For this purpose, an example of a driver system and luminaire usable in the controllable lighting device of FIG. 5A will now be described. In particular, FIG. 5B illustrates a functional block diagram of a system 51, similar to that of FIG. 5A, except with a different driver system 553 and luminaire 531. The luminaire 531 combines general illumination light sources 550 with light emitters of image display device 519 to provide general illumination and image light.

The luminaire 531 of FIG. 5B may include a controllable lighting system 511, image display device 519 and output diffuser 509. The controllable lighting system 511 includes a general illumination device 550 which may be an LED array suitable for emitting general illumination light according to government and industry standards. The controllable lighting system 511 may also include an optional optical element 557 that may receive the general illumination light emitted from the general illumination device 550 and processes the received light according to a configuration of the optical element, and outputs the processed light toward the image display device 519. The image display device 519 may be a low resolution display device. The output diffuser 509 may be a static (i.e., not controllable, or dynamic) optical diffuser configured to diffuse the image light output by the image display device 519 and the controllable lighting system 511. The output diffuser 509 may be configured, by structural arrangement of the optical properties of different areas (not shown in this example) of the output diffuser 509 to provide one or more different light diffusion angles. The luminaire 531 may be controlled by a driver system 553.

The driver system 553 is coupled to a memory, such as memory 125 of FIG. 5A, and a host processor system, such as 115 of FIG. 5A. The host processor system may provide control signals, image data, general illumination configuration file and other information to the driver system 553. The driver system 553 may output control signals to the general illumination light source 550 that control one or more operational parameter(s) of the light output generated by the source 550. Although the driver system 553 may be a single integral unit or implemented in a variety of different configurations having any number of internal driver units, the example of system 553 may include a separate illumination light source driver 553A and a separate image display device driver 553B. The separate drivers, such as 553A and 553B, may be circuits configured to provide signals appropriate to the respective type of light source 550 of the controllable lighting system 511 utilized in the particular implementation of the luminaire 531, albeit in response to commands or control signals or the like from a host processing system (not shown in this example), such as host processor system 115 of FIG. 5A. For example, the driver system 553 may include an image display light source driver coupled to the image display device and an image data source, wherein the image display light source driver outputs signals to the image display light source representative of the down-sampled image In such an example, the driver system 553 via a coupling to the host processor system 115 is configured to directly access configuration data, such as 128 of FIG. 4 stored in the memory, such as 125 of FIG. 5A, and generate control signals for presenting the image on the image display device 519 and control signals for generating light for output from the general illumination device 550.

Similar to the configuration files 128 discussed above with reference to FIG. 5A, each configuration file usable in the example system 51 of FIG. 5B may also include software control data to set the light output parameters of the controllable illumination system 511, at least with respect to one or more operational parameters for the controllable general illumination device 550 and control of the image display device 519.

In a typical example, execution of the programming by the host processing system and associated control via the driver system 553 configures the lighting system 511 to perform functions, including functions to operate the general illumination device 550 to provide light output from the controllable lighting system 511 based on the lighting device configuration information 128 and the image light output by the image display device 519

The luminaire 531 is configured such that the controllable lighting system 511 is positioned to output general illumination light toward the image display device 519. The general illumination light is intended to pass through the image display device 519, and combine with the image light output by the image display device 519 to provide general illumination and image light. The image light appearing pixelated, as in image 255A of FIG. 2A, when output from the image display device 519. The general illumination light and image light passes through the output diffuser 509, which diffuses the general illumination light and image light such that the diffused image light presents an image that appears to have fuzzy pixels such as those in image 257A of FIG. 2A.

The combining of the general illumination light with the image light output by the image display device 519 may present challenges to prevent occlusion of the general illumination light output by the general illumination device 550 by the image display device. 519. It may be appropriate at this time to describe an example of a structural arrangement of a luminaire that would suitable for use as luminaire 531.

The luminaire 531 may be replaced with a luminaire having a different configuration, such as luminaire 201 of FIG. 2A, which may be incorporated into the lighting device 111 of FIG. 5A. In such a configuration, the luminaire 201 may be controlling in a similar manner as described with reference to FIG. 2A to provide a fuzzy pixel image output.

Figure 6:
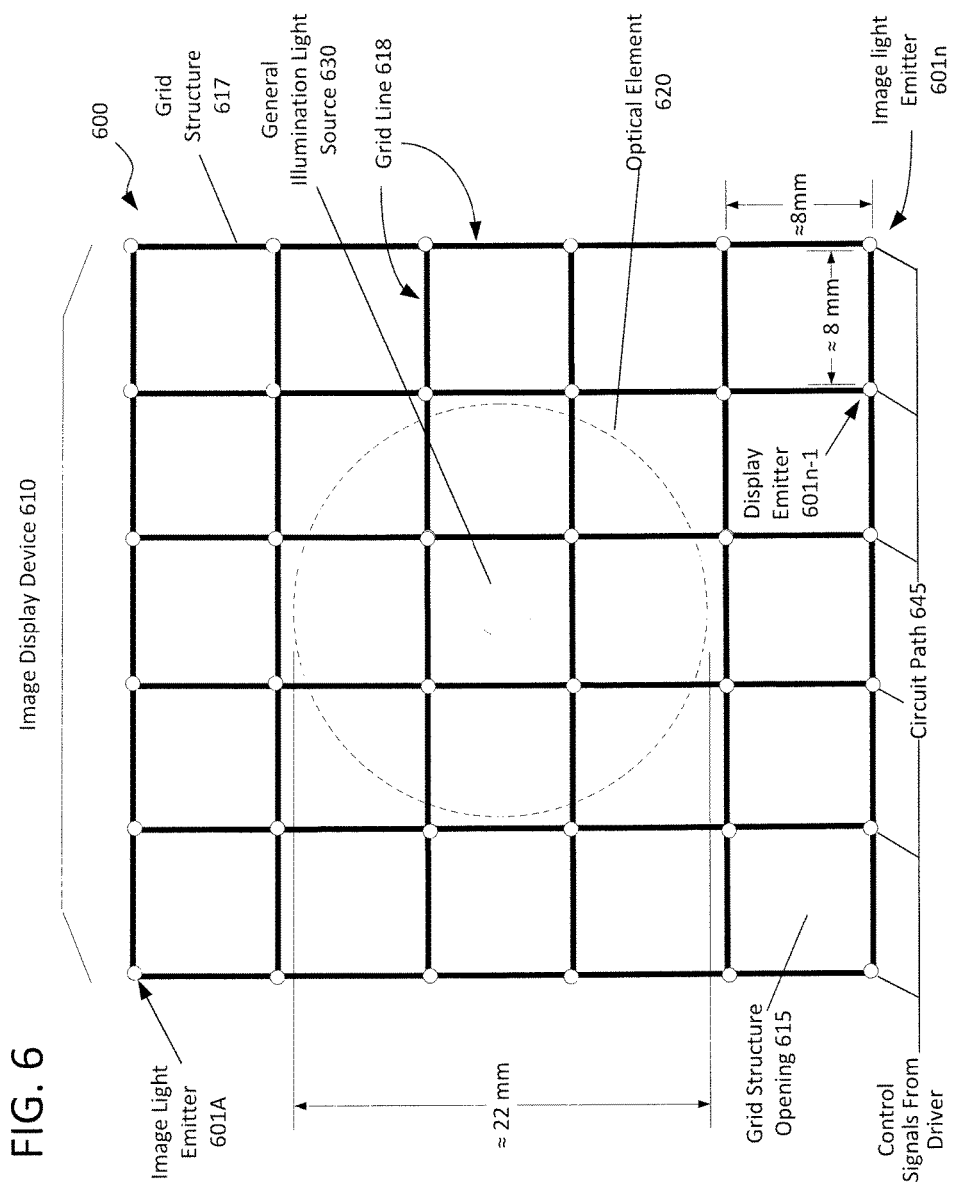
FIG. 6 is a plan view of a portion of an example of a luminaire including a number of pixels of a display device and one light source of the general illumination device.

FIG. 6 is a high-level functional block diagram of an example of a luminaire including a display device that displays a transformed image display and a general illumination device that provides general illumination.

For ease of discussion on a portion of the luminaire 600 is presented. The portion of the luminaire 600 includes a portion of an image display device 610, an optical element 620 and a general illumination emitter 630.

The image display device 610 includes a number of image light emitters 601A-n, and a grid structure 617 that has open spaces 615. The individual image light emitters 601A-n may be light emitted diodes (LEDs) configured to output red, green and blue (RGB) and optionally, white light (RGBW). Alternatively, an individual image light emitters 601A-n may single color (e.g., red) or bi-color (e.g., red, green or green, yellow) LEDs. The number of light emitters 601A-n are respectively arranged in a plurality of nodes on a grid that form a pattern, such as a pattern of squares or a honeycomb pattern made of hexagonal shapes. In the example, the grid structure 617 is in a pattern made up of a number of adjacent squares. Of course, the grid structure 617 could be formed from other shaped sections, such as rectangular, hexagonal, or the like. Each display emitter of the number of the image light emitters 601A-n, in this example, occupies a corner of a square in the grid structure 617. In addition or alternatively, the image light emitters 601A-n may be positioned at other locations along the gird structure 617 such as a side of the squares that form the grid structure 617. The individual image light emitters of the number of image light emitters 601A-n may be a node on the grid, and the number of image light emitters 601A-n may be referred to as a number of nodes. Each node in the number of nodes, in the same locations as image light emitters 601A-n, is configured to output image light representing a pixel of the low-resolution image in the direction of the output diffuser, such as 509 of FIG. 5. The respective nodes of the grid structure 617 may be coupled to a driver or driver system, such as driver system 553 of FIG. 5 or display driver 113B of FIG. 4, via a circuit path 645.

In more detail, the grid structure 617 of the image display device 610 is arranged such that the image light emitters 601A-n are located at the intersecting points between the grid lines 618. The open spaces 615 in the grid structure 617 between the respective image light emitters 601A-n may or may not be filled with transparent or partially transmissive materials. The grid structure 617 is further configured to output image light of a down-sampled image according to an image source, such as the processor 123 of FIG. 4, the driver system 553 of FIG. 5 or the display driver 113B of FIG. 4. The pixel pitch (i.e. the distance from the center of an individual emitter (e.g. 601n-1) of the image light emitters 601A-n to another individual emitter (e.g. 601n)) in this particular grid structure may be approximately 8 millimeters (mm) as shown in the bottom corner of the grid structure 617. Of course, other pixel pitches may be used. For example, if an observer of the display device is farther away, such as in a stadium setting, the pixel pitch may be greater, such as 20-50 millimeters or the like. The example of FIG. 6 is but one example of an image display device usable in the lighting device and luminaire examples described herein, other image display device examples may include those described in U.S. patent application Ser. No. 15/198,712 entitled "Enhancements of a Transparent Display to Form a Software Configurable Luminaire" filed on Jun. 30, 2016, the entire contents of which are incorporated herein.

The view into the page of FIG. 6 is from the perspective of an observer in the area in which the luminaire 600 containing the image display device 610 is located, e.g., a retail space, a residence, an outdoor shopping venue or the like. Behind the grid structure 617 is an optical element 620 and a general illumination light source 630. The optical element 620 may be, for example, a total internal reflection optic, a fish eye lens, an electrowetting (EW) cell array, a liquid crystal polarization grating (LCPG), or the like. The EW cell and LCPG are examples of types of dynamic optical devices that are controllable to spatially modulate (e.g., beam shape and/or beam steer) light into the dynamic optical device. The dynamic optical device may, for example, be coupled to a processor such as 115 of FIG. 4. The optical element 620 may have a diameter of approximately 22 mm, although other diameters may also be used. While the shape of the optical element 620 is circular, other shapes such as squares, ovals, rectangles or the like, may be used. The general illumination light source 630 may be a single general illumination light emitter that emits light suitable for task lighting or other lighting, such as exit way lighting, according to industry and/or governmental standards (e.g., OSHA, IES or ANSI).

Since the gird structure 617 is in front (when observed by a viewer) of the general illumination light source 630 and the optical element 620, portions of the grid structure 617 as well as the individual image light emitters occlude a part of the modulated light output from the optical element 620. This is described in more detail with reference to FIG. 7.

Figure 7:
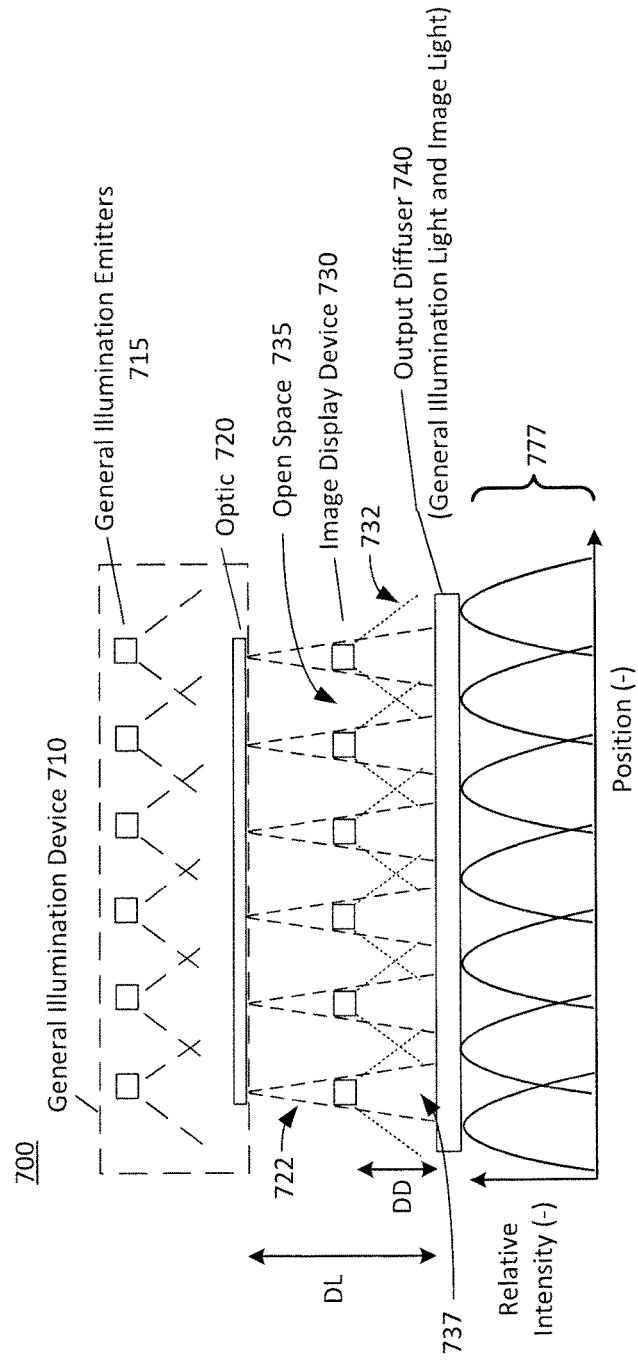
FIG. 7 is a high-level cross-sectional view of an example of a luminaire including a display device that displays a transformed image and a general illumination device that provides general illumination.

FIG. 7 is a high-level cross-sectional view of an example of a luminaire including a display device that displays a transformed image display and a general illumination device that provides general illumination.

The luminaire 700 includes a general illumination device 710, an image display device 730 and an output diffuser 740. The general illumination device 710 includes general illumination emitters 715, which may be one or more LEDs arranged in an array, and an optic 720. The optic 720 may be an optical element such as 620 of FIG. 6. The image display device 730 similar to image display device 610 may be arranged in a grid structure with a number of individual image light emitters. As a result, occlusion areas beneath the grid lines, such as 618 of FIG. 6, and the individual image light emitters of image display device 730, may appear as shadows to an observer. The occlusion areas beneath the individual image light emitters are shown, for example, as occlusion area 737. For example, the graphic 777 illustrates the shadow effect of limited diffusion as an intensity variation along an output surface of diffuser 740. As shown in the graphic 777, the relative intensity beneath an occlusion area, such as 737, is lower than the intensity in a non-occluded region to the right or left of the occlusion areas, such as 737.

In order to mitigate the effects of the occlusion area shadows, the output diffuser 740 may be configured to diffuse both the processed output light 722 from optic 720 and the image light output 732 by the image display device 730. The diffusion angle of the output diffuser 740 is intended to blend the modulated output light and the image light to fill the occlusion areas.

Hence, the general illumination light emitter 715 of the general illumination device 710 is arranged with respect to the output diffuser 740 such that a distance between the light emitter 715 or general illumination device 710 and the output diffuser 740 is approximately equal to a light emitter distance DL. Similar to discussion of the image display pixels and the distance Dd of FIG. 2A, the light emitter distance DL is affected by the lighting distribution provided by the optic 720, spacing between the general illumination emitters, and the output diffuser properties. The light emitter distance DL may be measured from the final surface of the optic 720. In a particular example, the optic 720 may include a total internal reflection (TIR) lens and fish eye lens designed with the general illumination light emitters 715 may have a distribution angle, such as θe of FIG. 2A of approximately 40-45 degrees. The output diffuser may be a holographic diffuser having approximate a 40 degree diffusion angle. Assuming here that the lighting angle θe is larger than the diffusion angle, based on the previous discussion we can roughly estimate that DL/Dd=PL/Pd where PL and Pd are the perceived pixel sizes for the general illumination emitters and the image display device respectively. These may be chosen to be equal to the corresponding spacing between the respective emitters to get 100% fill factor. As an example if the illumination light emitters are 32 mm apart and the image display emitters are 8 mm apart (previous example), roughly DL=32/8*Dd=4*Dd. For the holographic diffuser with 40 degree diffusion angle, the distance DL between the optic 720 and the output diffuser 740 may be approximately 3-4 inches, roughly 4 times that required for the image display device with ¼$^{th}$ the spacing between the display pixels. At the DL distance of approximately 2-3 inches and with the general illumination light emitters spaced approximately 32 mm apart, the lighting distribution of the general illumination light output by the general illumination light emitters will illuminate areas that are substantially side by side at a typical ceiling height. Generally, the general illumination lighting distribution is not as wide as the image display device 730 light distribution because the spacing between the general illumination emitters 715 is wider than the image light emitters of the image display device 730. Hence, generally a larger DL is required to overlap the general illumination lighting zones compared to the distance DD required to overlap the image pixels. In this example, the image display device 730 is arranged with respect to the output diffuser 740 such that a distance between the image display light source layer and the output diffuser is approximately equal to a display distance DD. In an example, DD is measured from the image display device 730 to the output diffuser 740. In a specific example, the display distance DD may be between approximately 1 to 2 inches that substantially achieves an approximate 100% fill factor with the approximate 8 mm pixel pitch of the display device 730 when the output diffuser 740 is a holographic diffuser having a diffusion angle between approximately 20 degrees and 40 degrees.

The ratio between this light emitter distance DL and the display distance DD determines how effectively the output diffuser 740 blends the image light and the general illumination light when diffusing the light. In the present example, the ratio of DL to DD is greater than 1. In this example, the ratio relates to the differences between the image display device 730 and the general illumination emitters 715. Depending on the respective light distributions of the general illumination emitters, the light distribution of the image display device emitters, the spacing between emitters of the image display device, and the light diffusion angle of diffuser, the ratio DL to DD may have to be adjusted to smooth out the final appearance of both the lighting regions and the image at the output diffuser 740. For example, the ratio may be different based on characteristics, such as pixel shape and/or pixel pitch, of the image display device 730.

The ratio of the distances DL and DD is one factor in setting the size of the fuzzy pixels presented at the output of output diffuser. The effectiveness of blending of the image light and the general illumination light is another factor in creating the fuzzy pixels such that the low resolution, pixelated image produced by the image light alone is smoothed to create an image such as 257A as shown in FIG. 2.

Generally, lighting distribution is not as wide as the display, the spacing between the lighting emitters is wider. Therefore, in general, a larger DL is required to overlap the lighting zones compared to the distance Dd required to overlap the display pixels. In addition, the ratio of DL to DD, and in this example, relates to the differences between the image display device 730 and the general illumination emitters 715. Depending on the respective distributions of the image display device 730 and the general illumination emitters 715, spacing between emitters, and the diffuser, this ratio has to be adjusted to smooth out the final appearance of both the lighting regions and the image at the diffuser layer.

Figure 8:
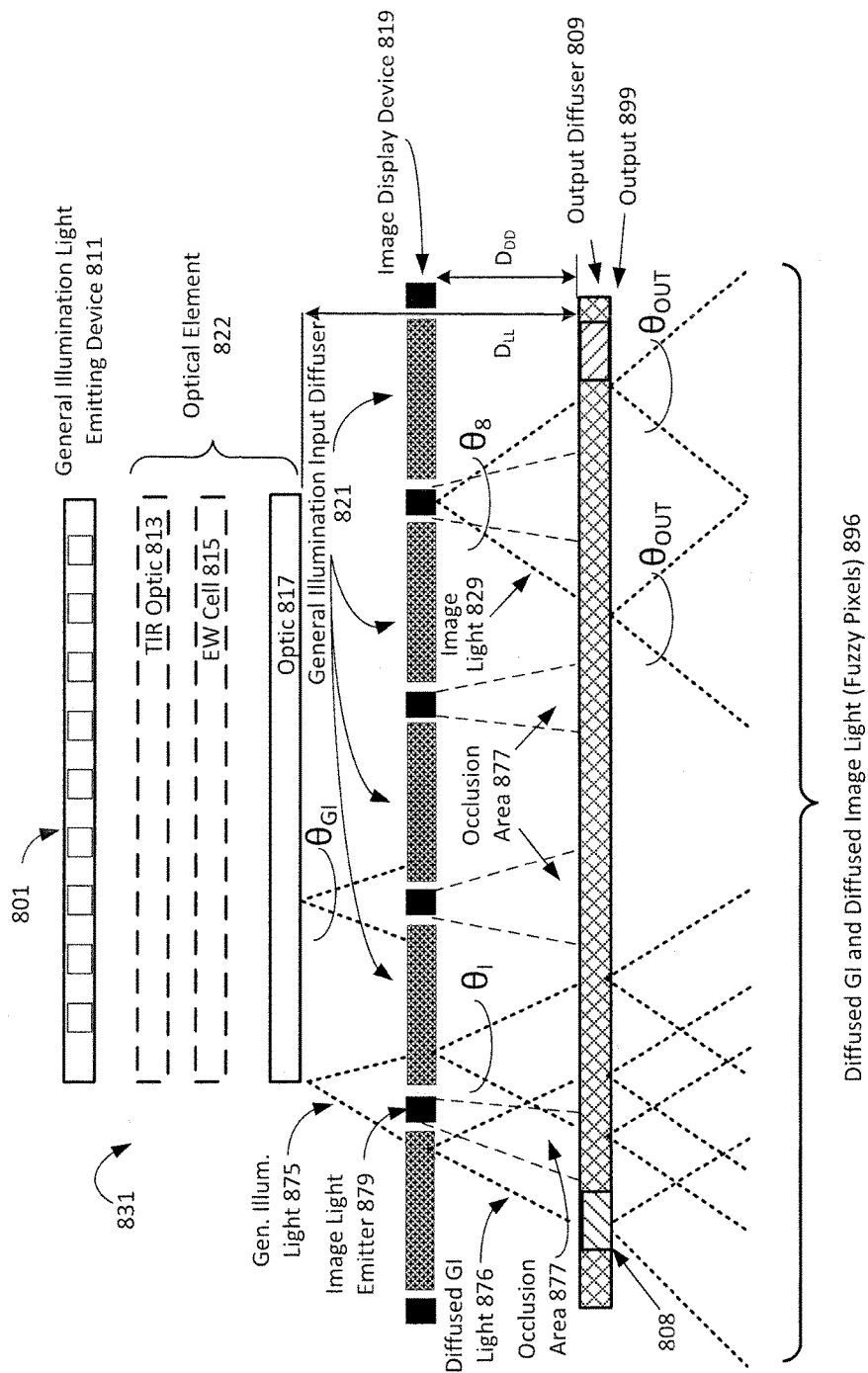
FIG. 8 is a more detailed high-level cross-sectional view of an example of a luminaire including a display device that displays a transformed image and a general illumination device that provides general illumination.

FIG. 8 is a more detailed high-level cross-sectional view of an example of a luminaire including a display device that displays a transformed image display and a general illumination device that provides general illumination.

In the example of FIG. 8, luminaire 831 may include general illumination light emitting device 811, an optical element 822, a general illumination input diffuser 821, an image display device 819, and an output diffuser 809. As shown in the cross-sectional view of FIG. 8, the luminaire 831 is formed by a general illumination light emitting device 811 optionally in combination with a spatial light modulation optic 822. The luminaire 831 including the respective of general illumination light emitting device 811, optical element 822, general illumination input diffuser 821, image display device 819, and output diffuser 809 operate and are controlled essentially as described by way of example above, to produce a distributed light output suitable for general illumination and for providing an image having fuzzy pixels, and of a particular image pixel fill factor.

In one example, general illumination light emitting device 811 includes an array of light emitters 801, such as LEDs, configured to emit light for general illumination within an area, such as a room, a warehouse, a street, an outdoor parking lot, a parking garage, an arena, a stadium or the like, in which the lighting device is located. In another example, the general illumination light emitting device 811 may have one or more light emitters to output a sufficient amount of light to provide general illumination substantially meeting governmental and/or industry standards, such as OSHA, IES, ANSI or the like. The one or more light emitters of the general illumination light emitting device 811 outputs light having a general illumination light emitter diffusion angle θE.

For example, the optical element 822 is configured to receive light emitted by the general illumination light emitting device 811, and output modulated general illumination light toward the image display device 819. The optical element 822 may include at least one or more of a total internal reflection (TIR) optic 813, an electrowetting (EW) cell array 815, or an optic 817, such as a fish eye lens. The light diffusion angle of general illumination light output from the optical element 822 may be approximately θGI. The TIR optic 813 may be a collimating optic. The optical element 822 may modulate the light output from the general illumination light emitting device 811. Optical element 822 enables light emitted by the general illumination light emitting device 811, and optionally collimated by collimating optics, such as TIR 813, to be shaped and/or steered by the EW cell 815 for general illumination within an area. To explain in more detail by way of example, the combined lighting system 811 may receive control signals from a driver system, such as 553, that control beam steering/beam shaping by optical element 822, in particular, the EW cell 815, to process light with a particular beam steering and/or beam shaping process to provide a desired spatial distribution of general illumination.

The image display device 819 may include an image light emitter that outputs light having an image light divergence angle θ8. The image display device 819 has a first resolution that is dependent upon on the pixel pitch as described above with reference to FIG. 6. The image display device 819 of FIG. 8 may have a grid structure (such as 617 shown in FIG. 6) formed of a number of individual light emitting devices (shown as black squares) positioned within the grid structure. The respective individual light emitting devices are pixels of the image display device that are configured to output image light that presents a low resolution, pixelated image at an output of the image display device 819. In some examples, the image display device 819 is transparent, or substantially transparent. For example, a transparent, or substantially transparent, image dis display device 819 may be fabricated from organic light emitting diodes (OLEDs) or other transparent light sources.

In the example, the general illumination input diffuser 821 may be configured to diffuse light from the general light emitting device 811 around the plurality of image light emitters (also referred to as grid structure nodes) and output the diffused light toward the output diffuser 809. The general illumination input diffuser 821 may be positioned in open spaces of the grid structure (not shown in this example) between the respective image light emitters 879 of the image display device 819. Alternatively, the input diffuser may be positioned above the image display device 819 or below the image display device 819 with holes arranged such that the image light emitters 879 emit image light unobstructed through the general illumination input diffuser 821. A purpose of the general illumination input diffuser 821 to diffuse the general illumination light such that the shadows in the occlusion areas 877 are lessened. The output diffuser 809 diffuses the image light 829 to provide the "fuzzy pixels." The "size" of the fuzzy pixels of the image that is presented to an observer is determined by the diffuser 809 and the distance $D_{DD}$.

In one example, output diffuser 809 may be fabricated to have a diffusion angle $θ_{OUT}$ that may at least in part be determined based on the diffusion angle $θ_8$ of the general illumination input diffuser 821. The output diffuser 809 may also hide some features of the other elements, e.g., 817 and 811, behind it that may otherwise be more visible.

The image display device 819 may be a grid structure having a number of image light emitters, such as 617 including image light emitters 601A-n of FIG. 6. For example, the image display device 819 may have a number of RGB or RGBW LEDs arranged in a display grid that outputs a low resolution, pixelated image. Alternatively, the individually colored LEDs, such as red (R), green (G), blue (B) or white (W) may be positioned at respective nodes of the grid structure 617.

Recall the grid structure 617 of FIG. 6 included open spaces 615, which may or may not have been filled with a transparent or partially transmissive material. Also recall the discussion of the shadowing effect caused by the light emitters and grid structure of the image display device 730 of FIG. 7. This is illustrated as occlusion area 877 in FIG. 8. The combined lighting device 831 is configured to mitigate the shadowing effect described with reference to FIG. 7. In the example of FIG. 8, the combined lighting device 831 includes a general illumination input diffuser 821 positioned proximate to the output of the image display device 819 in substantially the same locations as the open spaces 615. The general illumination input diffuser 821 is configured to diffuse the general illumination light, such as 875, at or proximate to the image display device 819. In the configuration of the combined lighting device 831, the general illumination input diffuser 821 has an input light diffusion angle $θ_I$, and is further configured to diffuse light 875 input to the general illumination input diffuser 821 from the general illumination light emitting device 811 according to the input light diffusion angle $θ_I$. As a result, the general illumination light is diffused as diffused general illumination (GI) light 876 toward the occlusion area 877 beneath the grid structures (not shown in this example) and image light emitters 879 of the image display device 819. In addition in some examples, the output diffuser 809 may be configured with areas, such 808 that provide a diffusion angle that is specified to provide a predetermined amount of diffusion of the image light output by each of the respective nodes, i.e. image light emitters 879, of the image display device 819.

The output diffuser 809 has an output diffusion angle $θ_{OUT}$. The output diffuser 809 is configured to receive the image light that forms a low resolution image from the image display device 821. The low resolution image may at the output from image display device 821 appear as a pixelated image, such as 255A of FIG. 2 to an observer. The pixelated image produced by the image light output from the image display device 819 has a first spatial frequency. The output diffuser 809 is configured to pass the image light. The output diffuser 809 is configured to blend the image light of adjacent pixels of the low resolution, pixelated image to smooth the pixelated image. The output diffuser 809 outputs the general illumination light and the low resolution image as diffused general illumination (GI) and image light 896 according to the output diffusion angle $θ_{OUT}$. As a result, the reduced intensity due to the shadow effect in the occlusion areas 877 is mitigated. In addition, the outputted low resolution image has a smoothed or fuzzy pixel appearance and the general illumination light is output to satisfy the desired general illumination lighting according to governmental and/or industry standards.

As mentioned, a processor, such as 123 of FIG. 1, may be coupled to the optical element 822, the image display device 821, and the general illumination light emitting device 811. The processor may be configured to control the general illumination light emitter 811 to output the general illumination light 875 and the image light emitter of the image display device to output the image light 829.

A number of parameters may be taken into account when configuring the combined lighting device 831 to provide the appropriate amount of blending of light to output a smoothed low resolution image that is no longer pixelated. For example, parameters such as the distance $D_L$ between the general illumination light emitters 801 and the output diffuser 809, the distance $D_{DD}$ between the image light emitters 879 of the image display device 820 and the output diffuser 809, as well as the diffusion angles θOUT, θ8, θI, and θGI may be factored into the determination of the appropriate arrangement, or set up, of components of the combined lighting device 831. In particular, the arrangement of the general illumination light emitter 811, the image display device 819, the optical element 822, the image diffuser 821, and the output diffuser 809 to provide a smoothed low resolution image at the output 899 of the output diffuser 809. Examples of the input diffuser 821 and output diffuser 809 may be obtained from Luminit, LLC.

Figure 9:
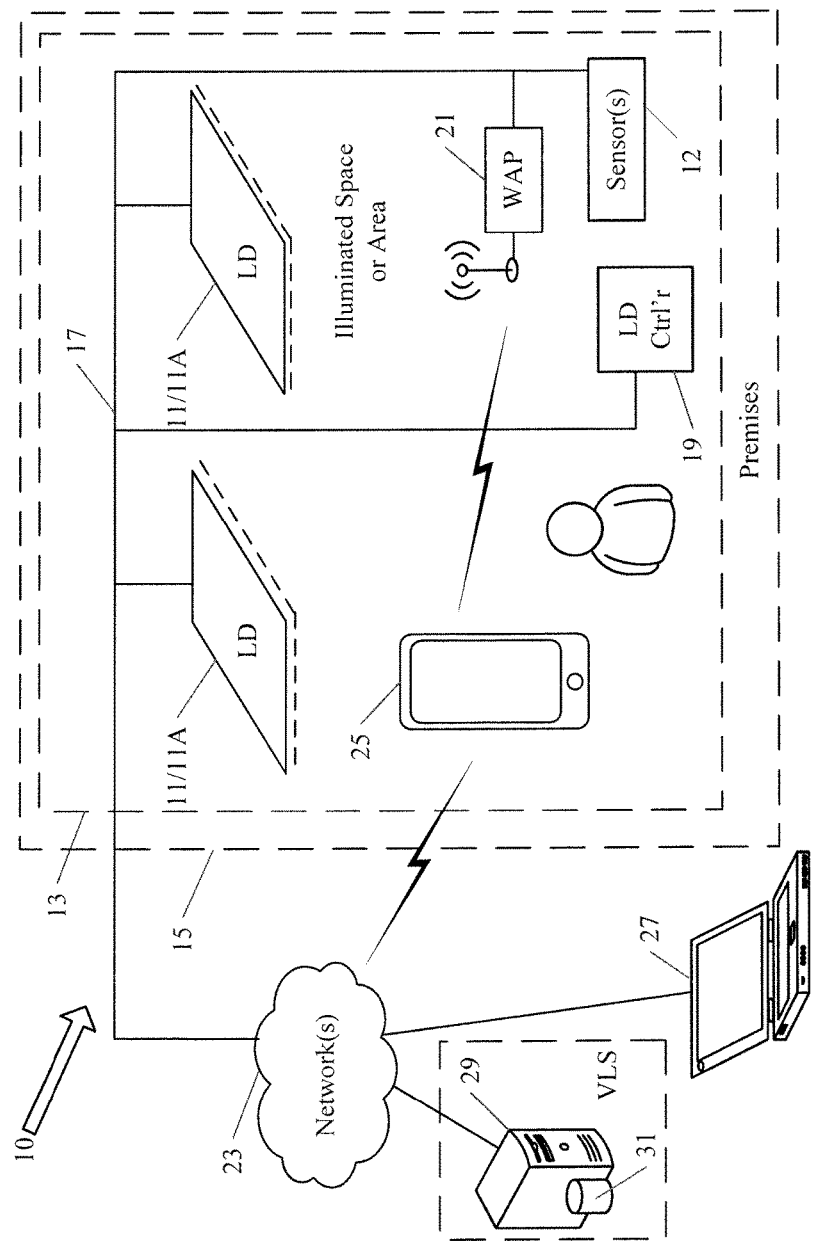
FIG. 9 is a simplified functional block diagram of a system in which devices like those of FIGS. 4-8 may be operated.

FIG. 9 is a simplified functional block diagram of a system in which devices like those of FIGS. 4-8 may be operated. In the examples of FIGS. 2-8, the image light and/or general illumination light from an image display device provides an image visible to a person within the space in which a lighting device is installed.

In the examples we have been considering so far, a processor, such as 123 configures the lighting device 11 to provide light output from an image display device, such as 119 or 819, and to operate the controllable lighting system 111 to provide general illumination that substantially emulates a lighting distribution of a selected one of a number of types of luminaire, based on the lighting device configuration information.

FIG. 9 illustrates a system 10 for providing an image e.g. based on a user selection, to a controllable lighting device (LD) 11 as discussed herein. For purposes of discussion of FIG. 9, we will assume that the controllable lighting device 11 generally corresponds in structure to the block diagram illustration of lighting device 111 in FIG. 4.

In FIG. 9, the controllable lighting device 11, as well as some other elements of system 10, are installed within an area or area 13 to be presented with an image and/or be illuminated at a premises 15. The premises 15 may be any location or locations serviced for lighting and other purposes by such system of the type described herein. Lighting devices, such as lighting devices 11, that are installed to provide general illumination lighting in the premises 15 typically comply with governmental building codes (of the respective location of the premises 15) other governmental regulations, and/or lighting industry standards, such as OSHA, IES and ANSI, for illumination devices. For example, there are governmental and/or industry standards for the number of foot-candles required for specific areas, see OSHA standard 1926.56. Most of the examples discussed below focus on indoor building installations, for convenience, although the system may be readily adapted to outdoor lighting. Hence, the example of system 10 provides configurable lighting and possibly other services in a number of service areas in or associated with a building, such as various rooms, hallways, corridors or storage areas of a building and an outdoor area associated with a building. Any building forming or at the premises 15, for example, may be an individual or multi-resident dwelling or may provide space for one or more enterprises and/or any combination of residential and enterprise facilities. A premises 15 may include any number of such buildings, and in a multi-building scenario the premises may include outdoor spaces and lighting in areas between and around the buildings, e.g. in a campus (academic or business) configuration.

The system elements, in a system like system 10 of FIG. 9, may include any number of controllable lighting devices 11 as well as one or more lighting controllers 19. Lighting controller 19 may be configured to provide control of lighting related operations (e.g., ON/OFF, intensity, brightness) of any one or more of the lighting devices 11. Alternatively, or in addition, lighting controller 19 may be configured to provide control of the software configurable aspects of lighting device 11, as described in greater detail below. That is, lighting controller 19 may take the form of a switch, a dimmer, or a smart control panel including a user interface depending on the functions to be controlled through device 19. The lighting system elements may also include one or more sensors 12 used to control lighting functions, such as occupancy sensors or ambient light sensors. Other examples of sensors 12 include light or temperature feedback sensors that detect conditions of or produced by one or more of the lighting devices. If provided, the sensors may be implemented in intelligent standalone system elements such as shown at 12 in the drawing, or the sensors may be incorporated in one of the other system elements, such as one or more of the lighting devices 11 and/or the lighting controller 19.

The on-premises system elements 11, 12, 19, in a system like system 10 of FIG. 9, are coupled to and communicate via a data network 17 at the premises 15. The data network 17 in the example also includes a wireless access point (WAP) 21 to support communications of wireless equipment at the premises. For example, the WAP 21 and network 17 may enable a user terminal for a user to control operations, such as provide an image for presentation to a processor, such as 115 of FIG. 4, of any lighting device 11 at the area 13. Such a user terminal is depicted in FIG. 9, for example, as a mobile device 25 within premises 15, although any appropriate user terminal may be utilized. However, the ability to control operations including the image presentation operations, of a lighting device 11 may not be limited to a user terminal accessing data network 17 via WAP 21 or other on-premises access to the network 17. Alternatively, or in addition, a user terminal such as laptop 27 located outside premises 15, for example, may provide the ability to control operations of one or more lighting devices 11 via one or more other networks 23 and the on-premises network 17. Network(s) 23 includes, for example, a local area network (LAN), a metropolitan area network (MAN), a wide area network (WAN) or some other private or public network, such as the Internet. In another example, a memory device, such as a secure digital (SD) card or flash drive, containing configuration data or image data may be connected to one or more of the on-premises system elements 11, 12 or 19 in a system like system 10 of FIG. 6.

For lighting operations, the system elements for a given service area (11, 12 and/or 19) are coupled together for network communication with each other through data communication media to form a portion of a physical data communication network. Similar elements in other service areas of the premises are coupled together for network communication with each other through data communication media to form one or more other portions of the physical data communication network at the premises 15. The various portions of the network in the service areas in turn are coupled together to form a data communication network at the premises, for example to form a LAN or the like, as generally represented by network 17 in FIG. 9. Such data communication media may be wired and/or wireless, e.g. cable or fiber Ethernet, Wi-Fi, Bluetooth, or cellular short range mesh. In many installations, there may be one overall data communication network 17 at the premises. However, for larger premises and/or premises that may actually encompass somewhat separate physical locations, the premises-wide network 17 may actually be built of somewhat separate but interconnected physical networks utilizing similar or different data communication media.

System 10 also includes server 29 and database 31 accessible to a processor of server 29. Although FIG. 9 depicts server 29 as located outside premises 15 and accessible via network(s) 23, this is only for simplicity and no such requirement exists. Alternatively, server 29 may be located within premises 15 and accessible via network 17. In still another alternative example, server 29 may be located within any one or more system element(s), such as lighting device 11, lighting controller 19 or sensor 12. Similarly, although FIG. 9 depicts database 31 as physically proximate server 29, this is only for simplicity and no such requirement exists. Instead, database 31 may be located physically disparate or otherwise separated from server 29 and logically accessible by server 29, for example via network 17.

Database 31 is a collection of configuration/image information/data files for use in conjunction with one or more of controllable lighting devices 11 in premises 15 and/or similar devices 11 of the same or other users at other premises. The database 31 may be an image source from which the lighting device 11 processor (shown in previous examples) obtains image data for presentation of a low-resolution image. For example, each configuration information file within database 31 may include lighting device configuration information as well as image data to operate the lighting device 11 to output image light as fuzzy pixels that presents a smoothed or blurred image as discussed and described in the examples of FIGS. 1-8.

Program aspects of the technology discussed above may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider into any of the lighting devices, sensors, user interface devices, other non-lighting-system devices, etc. of or coupled to the system 11 via communication interfaces 117, including both programming for individual element functions and programming for distributed processing functions. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:
1. A lighting device, comprising:
a general illumination light emitting array comprising one or more light emitters, the light emitting array configured to generate general illumination light that provides general illumination to an area of a space in which the lighting device is located;
an image display device located proximate to the general illumination light emitting array, the image display device having a plurality of image light emitters that output image light that presents an image having a first image pixel fill factor, and the image display device being configured to output image light corresponding to the image to be presented to the area;
an output diffuser having an output, and configured to diffuse the general illumination light and the outputted image light at a predetermined diffusion angle, the output diffuser positioned a distance from the image display device according to the predetermined diffusion angle;
a memory storing programming instructions;

a driver system coupled to supply drive signals to the general illumination light emitting array and the image display device; and a processor having access to the memory and coupled to the driver system to control operation of the driver system for the generation and output of light from the general illumination light emitting device and the image display device, wherein execution of the programming instructions stored in the memory by the processor configures the lighting device to perform functions including functions to:

obtain image data of an image for presentation by the image display device;

obtain a general illumination setting for generation of the general illumination light to provide general illumination of the area;

operate the driver system based on the image data to output image light from the image display device toward the diffuser, wherein an image presented at the output of the diffuser has a second image pixel fill factor greater than the first image pixel fill factor of the image output from the image display device.

2. The lighting device of claim 1, wherein one of the general illumination light emitting array or the image display device is transparent and emissive with respect to light output from the other of the general illumination light emitting array or the image display device.

3. The lighting device of claim 1, wherein the image display device comprises:

a plurality of light emitters arranged in a plurality of nodes on a grid that form a pattern, wherein each node in the plurality of nodes is:

configured to output light representing a pixel of the low-resolution image in the direction of the output diffuser, and coupled to the driver system; and an input diffuser configured to diffuse light from the general light emitting device around the plurality of nodes and output the diffused light toward the output diffuser.

4. The lighting device of claim 3, wherein:

the input diffuser comprises openings enabling light from the plurality of nodes of the image display device to pass through substantially unobstructed, the openings configured to align with the image display device.

5. The lighting device of claim 3, wherein:

the output diffuser is configured with areas that provide a diffusion angle configured to provide a predetermined amount of diffusion of the image light output by each of the respective nodes of the image display device.

6. The lighting device of claim 1, wherein the output diffuser is at least one of a prismatic diffuser, holographic diffuser, or a pattern diffuser.

7. The lighting device of claim 1, wherein transforming the obtained image comprises:

applying, by the processor, to the obtained image at least one of: a linear filter, a bilinear filter, a trilinear filter, an anisotropic filter, a nearest neighbor filter, or a bicubic filter.

8. The lighting device of claim 1, further comprising:

an optical element comprising at least one or more of:
 a total internal reflection optic,
 an electrowetting cell array, or
 a fish eye lens,
wherein the optical element is configured to:

receive light emitted by the general light emitting device, and output general illumination light toward a partially transmissive region of the image display device according to characteristics of the optical element.

9. A luminaire, comprising:

a general illumination light emitter array that emits general illumination light toward an area to be illuminated;

an optical element that receives the emitted general illumination light, processes the received light and outputs the processed general illumination light;

an image display device comprising image light emitters that emit image light and a grid structure having partially transmissive areas adjacent to the image light emitters, wherein portions of the grid structure create occlusion areas by occluding part of the processed general illumination light output from the optical element; and an output diffuser that diffuses both the processed general illumination light output and the image light output by the image display device, wherein a diffusion angle of the output diffuser disperses the image light output from the image light emitters to blend the processed general illumination light output and the image light output to fill the occlusion areas.

10. The luminaire of claim 9, comprising:

the general illumination light emitter is arranged with respect to the output diffuser such that a distance between the general illumination light emitter and the output diffuser is approximately equal to a light emitter distance $D_L$; and the image display device is arranged with respect to the output diffuser such that a distance between the image light emitters of the image display and the output diffuser is approximately equal to a display distance $D_D$.

11. The luminaire of claim 10, wherein a ratio of $D_L$ to $D_D$ is greater than 1.

12. The luminaire of claim 9, wherein at least one of the general illumination light emitter array and the image display device allow passage of light from the other.

13. An apparatus, comprising:

an image display device including:
 an image display device output, and
 a plurality of image light emitters; and an image diffuser having an input and an output, and positioned a distance from the image display device output, wherein:

the image display device being configured to:

output a low-resolution image via image light output from the plurality of image light emitters, the outputted image being pixelated at the image display device output, wherein the pixelated output image being pixelated due to a first image pixel fill factor; and the image diffuser being configured to:

diffuse image light received from the image display device at a predetermined image diffusion angle, and present, at the output of the image diffuser, an image, wherein the presented image has a second image pixel fill factor greater than the first image pixel fill factor.

14. A method, comprising:

obtaining by a processor coupled to a lighting device image data from an image source;

transforming the obtained image data into low-resolution image data, the low-resolution image data representing an image appropriate for display by an image display device;

driving the image display device in the lighting device based on the low-resolution image data;

outputting low-resolution image light from the image display device corresponding to the low-resolution image data toward an image diffuser coupled to the image display device, wherein:

the low-resolution image light having a first image pixel fill factor, and an image formed by the low-resolution image light includes image artifacts;

diffusing the image light by the image diffuser, the image diffuser being positioned to diffuse the image light from the image display device; and presenting at the output of the image diffuser an output image having a second image pixel fill factor, wherein the second image pixel fill factor is determined based on a distance between the image diffuser and an output of the image display device.

15. The method of claim 14, wherein:

the first image pixel fill factor of the image light is changed to a second image pixel factor based on a diffusion angle of the image diffuser.

16. The method of claim 14, wherein the second image pixel fill factor is greater than the first image pixel fill factor of the low resolution image output from the image display device.

17. The method of claim 14, wherein transforming the obtained image comprises:

selecting a down-sample filter setting to be applied to the image to achieve the first spatial frequency based on the second spatial frequency, wherein the first spatial frequency is determined based on the second spatial frequency, a diffusion angle of the image diffuser, and a diffusion angle of the image light from the image display device.

18. The method of claim 14, wherein the transforming the obtained image further comprising:

selecting a down-sample filter setting to be applied to the obtained image to achieve a first spatial frequency based on a diffusion angle of the input diffuser, and a diffusion angle of image light from the image display device.

19. The method of claim 14, wherein the presenting at the output of the image diffuser further comprising:

outputting general illumination light from a general illumination light emitter of the lighting device through partially transmissive areas of the image display device toward an output diffuser of the lighting device, the general illumination light emitter positioned within the lighting device proximate to the image display device.

20. A luminaire, comprising:

a general illumination light emitter configured to output general illumination light to provide general illumination to an area of a space in which the light is located, wherein the general illumination light emitter has a general illumination light emitter divergence angle;

a general illumination input diffuser positioned proximate to the output of the general illumination light emitter, wherein the general illumination input diffuser:

has an input light diffusion angle, and is configured to diffuse the general illumination light output from the general illumination light emitter according to the input light diffusion angle and the general illumination light emitter divergence angle;

an image display device including an image light emitter that outputs light having an image light divergence angle, wherein the image display device:

has a first resolution, and is configured to output image light that presents a low resolution, pixelated image at an output of the image display device;

an output diffuser having an output diffusion angle and an output, the output diffuser configured to:

receive the low resolution, pixelated image from the image display device, blend the image light of adjacent pixels of the low resolution, pixelated image to smooth the pixelated image according to the output diffusion angle and the image light divergence angle to form a smoothed low resolution image at the output of the output diffuser; and output the general illumination light and the smoothed low resolution image; and a processor coupled to the general illumination light emitter and the image display device, the processor configured to control the general illumination light emitter to output the general illumination light and the image light emitter of the image display device to output the image light.

21. The luminaire of claim 20, wherein the image display device is transparent.

22. The luminaire of claim 20, wherein at least one of the general illumination light emitter array and the image display device allow passage of light from the other.

23. The luminaire of claim 20, wherein the low resolution, pixelated image has a first spatial frequency and the smooth low resolution image has a second spatial frequency different from the first spatial frequency.

24. The luminaire of claim 22, wherein the second spatial frequency is determined based on a distance between the image display device and the output diffuser.

25. A lighting device, comprising:

(I) a luminaire, including:

(A) a lighting element including:

(i) a body with an illumination light output surface a predetermined distance from an opposing surface opposite the output surface; and (ii) a source of an illumination light coupled to or integrated into the body of the lighting element, configured to generate illumination light for emission through the output surface as light to an area for a general illumination application of the luminaire, at least some portions of the body of the lighting device being transmissive with respect to visible light; and (B) an image display device, (i) having a plurality of image light emitters that output image light that forms an image having a first image pixel fill factor at an output of the opposing surface of the lighting element, and (ii) coupled to supply light of the image to the opposing surface on the body of the lighting element for transmission through the body of the lighting element;

(C) a diffuser having an output diffusion angle is coupled to the output surface of the lighting element to allow passage of the image light that presents an image in the area and the general illumination light that provides general illumination light to the area, wherein:
the image light output from the diffuser has a second image pixel fill factor that is greater than the first image pixel fill factor,
the second image pixel fill factor based on the diffuser output diffusion angle, the predetermined distance between opposing surface and the output surface of the lighting element, and the first fill factor; and
(II) a processor coupled to the general illumination light source and the image display device to drive and control operation of the general illumination light source and the image display device, the processor being configured to:
operate the illumination light source to generate the general illumination light, and
operate the image display device to emit the light of the image having the first image pixel fill factor.

26. The lighting device of claim 25, wherein the lighting element is an edge-lit lighting element.

27. The lighting device of claim 26, wherein:
the edge-lit lighting element comprises a light transmissive waveguide as the lighting element body;
the output surface is a surface on the waveguide body;
the opposing surface is formed on the waveguide body opposite the output surface;
the waveguide further includes an input surface along a periphery of the waveguide body including along at least a portion of each of the output surface and the opposing surface; and
the illumination light source is coupled to supply general illumination light to the waveguide via the waveguide input surface for emission from the waveguide via the output surface.

* * * * *